United States Patent
Nam et al.

(10) Patent No.: US 12,028,871 B2
(45) Date of Patent: Jul. 2, 2024

(54) MONITORING OCCASIONS IN NON-CONSECUTIVE SLOTS

(71) Applicant: QUALCOMM Incorporated, San Diego, CA (US)

(72) Inventors: Wooseok Nam, San Diego, CA (US); Jing Sun, San Diego, CA (US); Xiaoxia Zhang, San Diego, CA (US); Tao Luo, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/647,794

(22) Filed: Jan. 12, 2022

(65) Prior Publication Data

US 2022/0264626 A1    Aug. 18, 2022

Related U.S. Application Data

(60) Provisional application No. 63/186,957, filed on May 11, 2021, provisional application No. 63/199,979, filed on Feb. 5, 2021.

(51) Int. Cl.
*H04W 72/23* (2023.01)
*H04W 48/10* (2009.01)
*H04W 74/0833* (2024.01)

(52) U.S. Cl.
CPC .......... *H04W 72/23* (2023.01); *H04W 48/10* (2013.01); *H04W 74/0833* (2013.01)

(58) Field of Classification Search
None
See application file for complete search history.

(56) References Cited

U.S. PATENT DOCUMENTS

2019/0098590 A1*  3/2019  Nam ................... H04W 56/001
2020/0196306 A1*  6/2020  Si ............................ H04L 5/001
(Continued)

FOREIGN PATENT DOCUMENTS

WO    WO-2021231816 A1    11/2021

OTHER PUBLICATIONS

Huawei, et al., "PDCCH Repetition for URLLC", 3GPP Draft, R1-1801781, 3GPP TSG RAN WG1 Meeting #92, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 17, 2018 (Feb. 17, 2018), XP051397755, 4 Pages, Retrieved from the Internet: URL:http://www.3gpp.org/ftp/tsg%5Fran/WG1%5FRL1/TSGR1%5F92/Docs/ [retrieved on Feb. 17, 2018] the whole document.

(Continued)

*Primary Examiner* — Hong S Cho
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a broadcast message associated with initial access. The UE may monitor, for an additional message from the base station, a set of monitoring occasions that are non-consecutive across slots, based at least in part on the broadcast message. In some aspects, the set of monitoring occasions are non-consecutive across slots based at least in part on a stored rule that uses a subcarrier spacing. Numerous other aspects are described.

30 Claims, 11 Drawing Sheets

(56) References Cited

U.S. PATENT DOCUMENTS

2021/0153137 A1\* 5/2021 MolavianJazi ..... H04W 52/325
2023/0146004 A1\* 5/2023 Niu ..................... H04L 5/0094
                     370/329

OTHER PUBLICATIONS

International Search Report and Written Opinion—PCT/US2022/070168—ISA/EPO—dated May 6, 2022.
Moderator (Apple Inc): "Feature Lead Summary #10 on Reduced PDCCH Monitoring", 3GPP Draft, R1-2009813, 3GPP TSG-RAN WG1 #103-e, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 26, 2020-Nov. 13, 2020, Nov. 19, 2020 (Nov. 19, 2020), XP051955964, pp. 1-22, Retrieved from the Internet: URL:https://ftp.3gpp.org/tsg_ran/WG1_RL1/TSGR1_103-e/Docs/R1-2009813.zip R1-2009813.docx [retrieved on Nov. 19, 2020] p. 14.
Samsung: "Extended PO for Paging inNR-U", 3GPP Draft, 3GPP TSG-RAN2 105bis, R2-1903106_EXTENDED PO for Paging in NR-U, 3rd Generation Partnership Project (3GPP), Mobile Competence Centre, 650, Route Des Lucioles, F-06921, Sophia-Antipolis Cedex, France, vol. RAN WG2, No. Xian, China, Apr. 8, 2019-Apr. 12, 2019, Apr. 6, 2019 (Apr. 6, 2019), XP051700460, 4 Pages, Retrieved from the Internet: URL:http://www.3gpp.org/ftp/Meetings%5F3GPP%5FSYNC/RAN2/Docs/R2%2D1903106%2Ezip [retrieved on Apr. 6, 2019] the whole document.

\* cited by examiner

MONITORING OCCASIONS IN NON-CONSECUTIVE SLOTS

CROSS-REFERENCE TO RELATED APPLICATIONS

This Patent application claims priority to U.S. Provisional Patent Application No. 63/199,979, filed on Feb. 5, 2021, entitled "MONITORING OCCASIONS IN NON-CONSECUTIVE SLOTS," and assigned to the assignee hereof, and to U.S. Provisional Patent Application No. 63/186,957, filed on May 11, 2021, entitled "MONITORING OCCASIONS IN NON-CONSECUTIVE SLOTS," and assigned to the assignee hereof. The disclosures of the prior Applications are considered part of and are incorporated by reference in this Patent Application.

FIELD OF THE DISCLOSURE

Aspects of the present disclosure generally relate to wireless communication and to techniques and apparatuses for configuring and using monitoring occasions in non-consecutive slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive, from a base station, a broadcast message associated with initial access. The one or more processors may be further configured to monitor, for an additional message from the base station, a set of monitoring occasions that are non-consecutive across slots, based at least in part on the broadcast message.

Some aspects described herein relate to an apparatus for wireless communication at a base station. The apparatus may include a memory and one or more processors coupled to the memory. The one or more processors may be configured to transmit, to a UE, a broadcast message associated with initial access. The one or more processors may be further configured to transmit an additional message, to the UE, based at least in part on a set of monitoring occasions that are non-consecutive across slots and that are based at least in part on the broadcast message.

Some aspects described herein relate to a method of wireless communication performed by a UE. The method may include receiving, from a base station, a broadcast message associated with initial access. The method may further include monitoring, for an additional message from the base station, a set of monitoring occasions that are non-consecutive across slots, based at least in part on the broadcast message.

Some aspects described herein relate to a method of wireless communication performed by a base station. The method may include transmitting, to a UE, a broadcast message associated with initial access. The method may further include transmitting an additional message, to the UE, based at least in part on a set of monitoring occasions that are non-consecutive across slots and that are based at least in part on the broadcast message.

Some aspects described herein relate to a non-transitory computer-readable medium that stores a set of instructions for wireless communication by a UE. The set of instructions, when executed by one or more processors of the UE, may cause the UE to receive, from a base station, a broadcast message associated with initial access. The set of instructions, when executed by one or more processors of the UE, may further cause the UE to monitor, for an additional message from the base station, a set of monitoring occasions that are non-consecutive across slots, based at least in part on the broadcast message.

Some aspects described herein relate to a non-transitory computer-readable medium that stores a set of instructions for wireless communication by a base station. The set of instructions, when executed by one or more processors of the base station, may cause the base station to transmit, to a UE, a broadcast message associated with initial access. The set of instructions, when executed by one or more processors of the base station, may further cause the base station to transmit an additional message, to the UE, based at least in part on a set of monitoring occasions that are non-consecutive across slots and that are based at least in part on the broadcast message.

Some aspects described herein relate to an apparatus for wireless communication. The apparatus may include means for receiving, from a base station, a broadcast message associated with initial access. The apparatus may further include means for monitoring, for an additional message from the base station, a set of monitoring occasions that are non-consecutive across slots, based at least in part on the broadcast message.

Some aspects described herein relate to an apparatus for wireless communication. The apparatus may include means for transmitting, to a UE, a broadcast message associated with initial access. The apparatus may further include means for transmitting an additional message, to the UE, based at least in part on a set of monitoring occasions that are non-consecutive across slots and that are based at least in part on the broadcast message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
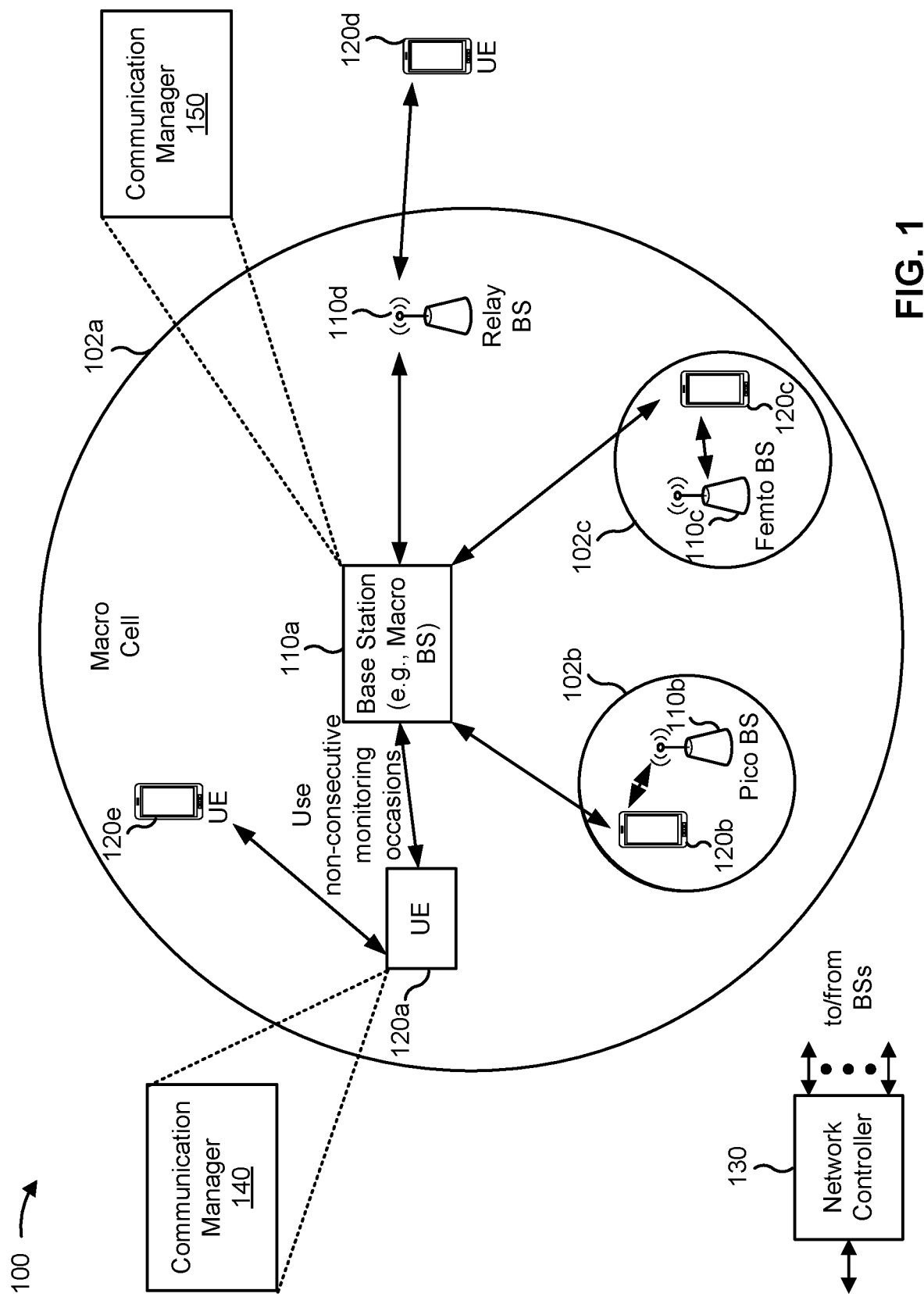
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As shown in FIG. 1, and as described in more detail elsewhere herein, the communication manager 140 may receive (e.g., from the base station 110) a broadcast message associated with initial access and monitor, for an additional message (e.g., from the base station 110), a set of monitoring occasions that are non-consecutive across slots, based at least in part on the broadcast message. Additionally, or alternatively, the communication manager 140 may perform one or more other operations described herein.

Similarly, in some aspects, the base station 110 may include a communication manager 150. As shown in FIG. 1, and as described in more detail elsewhere herein, the communication manager 150 may transmit (e.g., to the UE 120) a broadcast message associated with initial access and transmit an additional message (e.g., to the UE 120) based at least in part on a set of monitoring occasions that are non-consecutive across slots and that are based at least in part on the broadcast message. Additionally, or alternatively, the communication manager 150 may perform one or more other operations described herein.

As indicated above, FIG. 1 is provided as an example. Other examples may differ from what is described with regard to FIG. 1.

Figure 2:
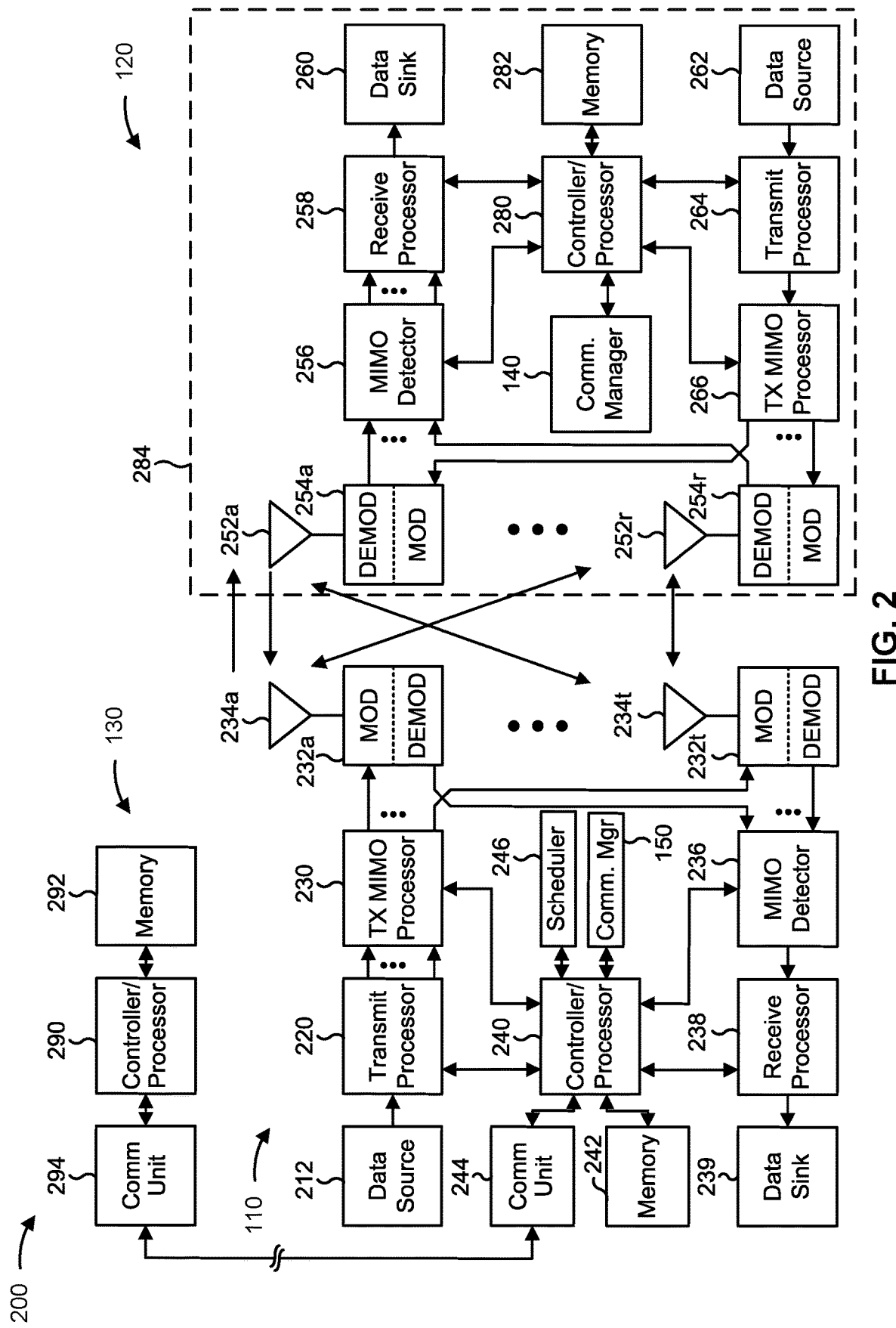
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232.

Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with configuring and using monitoring occasions in non-consecutive slots, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 1000 of FIG. 10) may include means for receiving, from a base station (e.g., the base station 110 and/or apparatus 1100 of FIG. 11), a broadcast message associated with initial access; and/or means for monitoring, for an additional message from the base station, a set of monitoring occasions that are non-consecutive across slots, based at least in part on the broadcast message. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station (e.g., the base station 110 and/or apparatus 1100 of FIG. 11) may include means for transmitting, to a UE (e.g., the UE 120 and/or apparatus 1000 of FIG. 10), a broadcast message associated with initial access; and/or means for transmitting an additional message, to the UE, based at least in part on a set of monitoring occasions that are non-consecutive across slots and that are based at least in part on the broadcast message. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
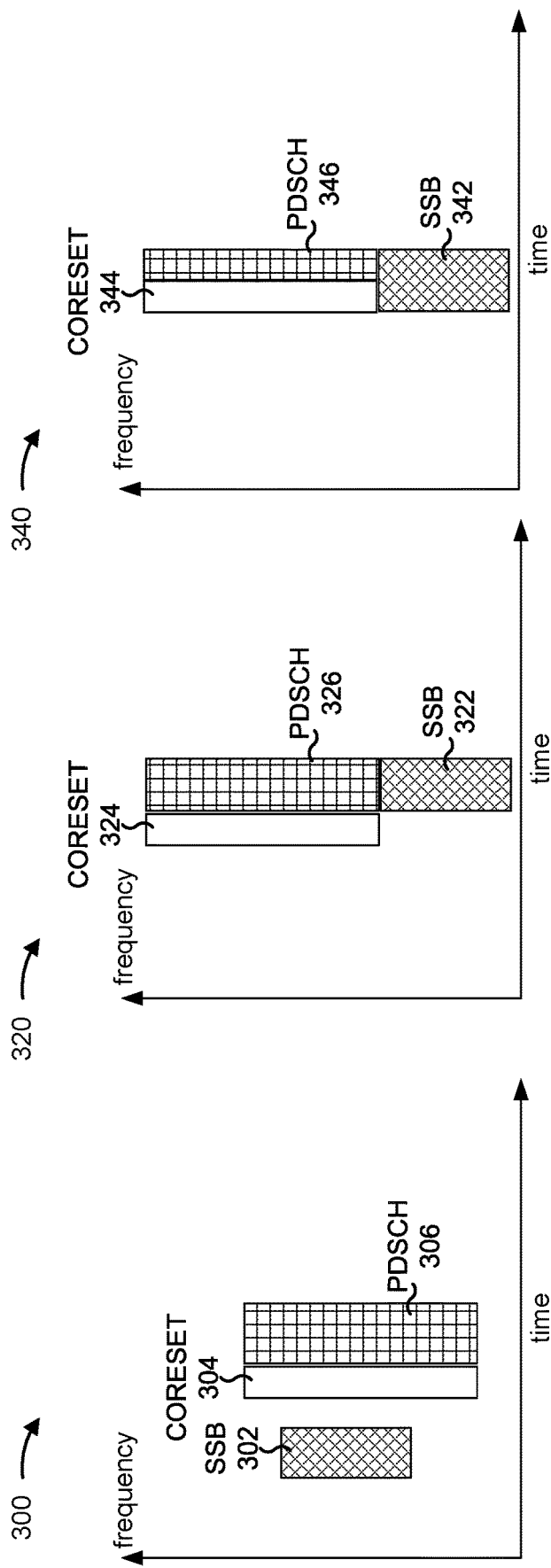
FIGS. 3A, 3B, and 3C are diagrams illustrating examples of control resource set (CORESET) and synchronization signal block (SSB) multiplexing patterns, in accordance with the present disclosure.

FIGS. 3A, 3B, and 3C are diagrams illustrating examples 300, 320, and 340, respectively, of CORESET and SSB multiplexing patterns, in accordance with the present disclosure. As shown in FIGS. 3A, 3B, and 3C, a base station (e.g., base station 110) may broadcast an SSB 302, an SSB 322, or an SSB 342, respectively. The SSB may include a PSS and an SSS centralized within a physical broadcast channel (PBCH). Accordingly, an SSB may also be referred to as an SS/PBCH block.

In some aspects, a UE (e.g., UE 120) may detect the PSS and/or the SSS to determine a physical cell identifier (PCID) associated with the base station 110 and a timing associated with the PBCH. Accordingly, the UE 120 may decode the PBCH to obtain a master information block (MIB) message. The MIB message may include frequency and timing information to allow the UE 120 to establish a radio resource control (RRC) connection with a cell including the base station 110, as well as including information for scheduling reception of remaining minimum system information (RMSI) by the UE 120. For example, the MIB message may include a pdcch-ConfigSIB1 data structure (e.g., as defined in 3GPP specifications and/or another standard) and/or another similar data structure defining a search space (e.g., in a physical downlink control channel (PDCCH) and/or the like) in which the UE 120 may receive scheduling information for the RMSI. This search space may be referred to as a Type0-PDCCH common search space (CSS).

In some aspects, the MIB message may include information associated with a CORESET configuration defining physical resources (e.g., one or more frequencies, one or more slots, and/or other resources) for monitoring the Type0-PDCCH CSS. Accordingly, this CORESET may be referred to as a Type0-PDCCH CORESET.

In some aspects, as shown in FIG. 3A, the CORESET 304 may be multiplexed in a time domain with the SSB 302. This may be referred to as "multiplexing pattern 1" in 3GPP specifications and/or another standard. As an alternative, and as shown in FIG. 3B, the CORESET 324 may be multiplexed in a frequency domain and a time domain with the SSB 322. This may be referred to as "multiplexing pattern 2" in 3GPP specifications and/or another standard. As an alternative, and as shown in FIG. 3C, the CORESET 344 may be multiplexed in a frequency domain with the SSB 342. This may be referred to as "multiplexing pattern 3" in 3GPP specifications and/or another standard.

The RMSI may be included in an SIB message that is transmitted on a physical downlink shared channel (PDSCH). Accordingly, the scheduling information received in the Type0-PDCCH CSS may allow the UE 120 to receive the decode the SIB message. In some aspects, as shown in FIG. 3A, the PDSCH 306 (in multiplexing pattern 1) may be multiplexed in a time domain with the SSB 302. As an alternative, and as shown in FIG. 3B, the PDCCH 326 (in multiplexing pattern 2) may be multiplexed in a frequency domain with the SSB 322. As an alternative, and as shown in FIG. 3C, the PDCCH 346 (in multiplexing pattern 3) may be multiplexed in a frequency domain with the SSB 342.

As indicated above, FIGS. 3A-3C are provided as examples. Other examples may differ from what is described with respect to FIGS. 3A-3C.

Figure 4:
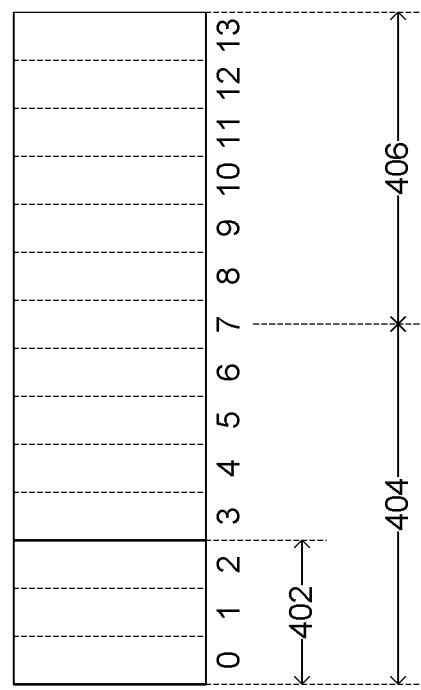
FIG. 4 is a diagram illustrating an example of processing time within a slot, in accordance with the present disclosure.

FIG. 4 is a diagram illustrating example 400 of processing time within a slot, in accordance with the present disclosure. As shown in FIG. 4, a base station (e.g., base station 110) may transmit scheduling information (e.g., on a PDCCH associated with a CORESET, as described above in connection with FIG. 3) during a time period 402 within a slot. As used herein, "slot" may refer to a portion of a subframe, which in turn may be a fraction of a radio frame within an LTE, 5G, or other wireless communication structure. In some aspects, a slot may include one or more symbols. In example 400, the slot includes fourteen symbols. Additionally, "symbol" may refer to an OFDM symbol or another similar symbol within a slot.

As further shown in FIG. 4, a UE (e.g., UE 120) that receives the scheduling information may use a time period 404 to receive (e.g., using one or more antennas to receive a signal encoding the scheduling information), decode (e.g., using demodulators and/or receive processors), and process (e.g., using a controller/processor to interpret binary data decoded from the received signal) the scheduling information. Accordingly, during time period 406, the UE 120 may enter a micro-sleep state to conserve power. A "micro-sleep" state may include a state in which one or more components of the UE 120 (e.g., antennas, demodulators, processors, and/or other hardware components) are either powered off temporarily or are idled to consume less power than if the one or more components were actively receiving signals, decoding signals, processing information, and/or performing other tasks.

As indicated above, FIG. 4 is provided as an example. Other examples may differ from what is described with respect to FIG. 4.

Generally, in multiplexing pattern 1, a UE is configured to monitor at least one monitoring occasion per slot in two consecutive slots. For example, the UE may monitor, for scheduling information associated with an SIB message, a set of monitoring occasions that includes monitoring occasions in consecutive slots. In multiplexing patterns 2 and 3, the UE may monitor, for scheduling information associated with an SIB message, a set of monitoring occasions that repeats with a periodicity equal to a periodicity of an associated SSB within an SSB burst set. Because SSB periodicity within an SSB burst set is often short, the UE generally monitors a set of monitoring occasions that includes monitoring occasions in consecutive slots. For other search spaces (e.g., a Type0A-PDCCH CSS associated with additional SIB messages, a Type1-PDCCH CSS associated with a random access response (RAR), and/or a Type2-PDCCH CSS associated with a paging occasion), a base station may instruct the UE to monitor a similar set of monitoring occasions that includes monitoring occasions in consecutive slots (e.g., by setting a SearchSpaceId for searchSpaceOtherSystemInformation, ra-SearchSpace, and/or pagingSearchSpace in PDCCH-ConfigCommon, as defined in 3GPP specifications and/or another standard, to zero).

In higher frequencies (e.g., between 52.6 GHz and 114.25 GHz), phase noise may increase. Accordingly, to reduce the impact of phase noise, a wireless network may employ larger subcarrier spacing (SCS). For example, FR2 may use between 60 kHz and 120 kHz SCS while higher frequencies may use between 240 kHz and 1.92 MHz SCS. Larger SCS results in slots with shorter length. For example, a slot in FR2 with 120 kHz SCS may be approximately 125 µs in length while a slot in higher frequencies with 960 kHz SCS may be approximately 15.6 µs in length. Accordingly, because the slot is shorter in duration, the UE may be unable to enter a micro-sleep state, as described above in connection with FIG. 4, because the UE may use an amount of time that includes all or close to all of a slot to receive, decode, and process information from the base station. Accordingly, the UE may consume significantly more power. Indeed, in some situations, the UE may use an amount of time that includes multiple slots to receive, decode, and process information from the base station. Accordingly, the UE and the base station may experience significant increase in latency and reduced quality and/or reliability of communications because the UE is unable to monitor all configured monitoring occasions.

Some techniques and apparatuses described herein enable a UE (e.g., UE 120) to monitor a set of monitoring occasions that are non-consecutive across slots. For example, a base station (e.g., base station 110) may configure the set of monitoring occasions using a broadcast message associated with initial access (e.g., an MIB message). Additionally, or alternatively, the UE 120 may determine to use the set of monitoring occasions based at least in part on a stored rule (e.g., according to 3GPP specifications and/or another standard). As a result, the UE 120 and the base station 110 may experience improved latency and increased quality and/or reliability of communications because the UE 120 is able to monitor all configured monitoring occasions. Additionally, the UE 120 may conserve power by using micro-sleep in at least a portion of at least some slots.

Figure 5:
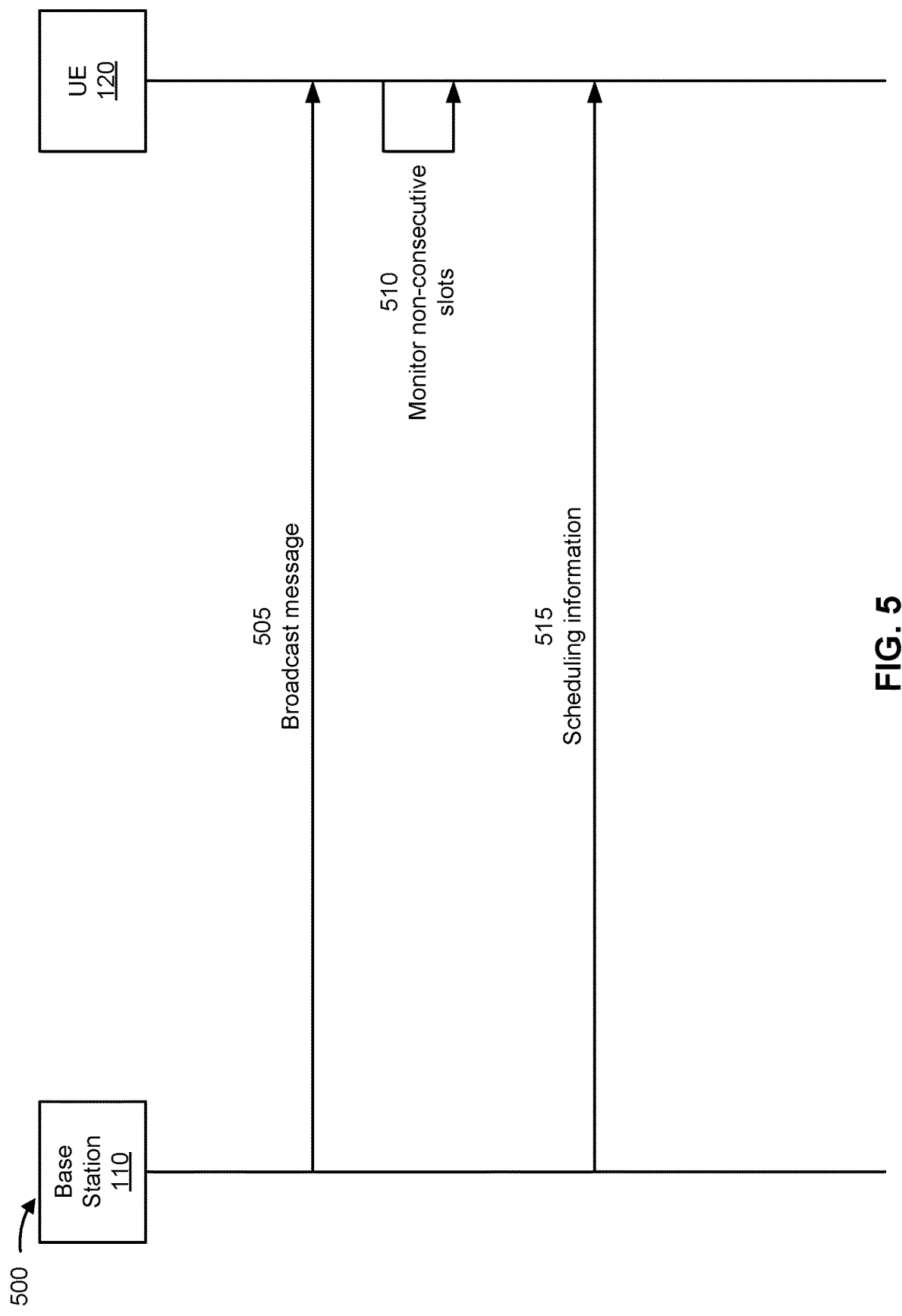
FIGS. 5, 6, and 7 are diagrams illustrating examples associated with monitoring non-consecutive slots, in accordance with the present disclosure.

FIG. 5 is a diagram illustrating an example 500 associated with monitoring non-consecutive slots, in accordance with the present disclosure. As shown in FIG. 5, example 500 includes communication between a base station 110 and a UE 120. In some aspects, the base station 110 and the UE 120 may be included in a wireless network, such as wireless network 100.

As shown in connection with reference number 505, the base station 110 may transmit, and the UE 120 may receive, a broadcast message associated with initial access. In some aspects, the broadcast message may include an MIB message. For example, the base station 110 may transmit the broadcast message on a PBCH included in an SSB.

As shown in connection with reference number 510, the UE 120 may monitor, for an additional message from the base station 110, a set of monitoring occasions that are non-consecutive across slots, based at least in part on the broadcast message. In some aspects, the UE 120 may monitor the set of monitoring occasions based at least in part on one or more bits of the broadcast message. For example, as described below in connection with FIG. 6, the broadcast message may include a pdcch-ConfigSIB1 and/or another similar data structure encoding an additional bit that, when set to '1' or 'TRUE,' instructs the UE 120 to use the set of monitoring occasions that are non-consecutive across slots and/or may include a separate bit (e.g., monitoringConfig and/or another variable, defined in 3GPP specifications and/or another standard) that instructs the UE 120 to use the set of monitoring occasions that are non-consecutive across slots.

Additionally, or alternatively, the UE 120 may monitor the set of monitoring occasions based at least in part on a stored rule that uses one or more of an SCS, a frequency, or a bandwidth, indicated in the broadcast message. For example, the UE 120 may be programmed (and/or other preconfigured) with a table or other data structure (e.g., as described below in connection with FIG. 6) that accepts the SCS, the frequency, and/or the bandwidth as input and outputs an indication to use the set of monitoring occasions that are non-consecutive across slots. In some aspects, the broadcast message may encode an index (e.g., using one or more bits of a pdcch-ConfigSIB1 and/or another similar data structure) that, when applied to a table or other data structure (e.g., as described below in connection with FIG. 6) with which the UE 120 is programmed (and/or otherwise preconfigured), instructs the UE 120 to use the set of monitoring occasions that are non-consecutive across slots.

In some aspects, the set of monitoring occasions may be associated with a PDCCH. Accordingly, the UE 120 may use the set of monitoring occasions to receive downlink control information (DCI) and/or other scheduling information on the PDCCH. Additionally, or alternatively, the set of monitoring occasions may be associated with a Type0-PDCCH CSS, a Type0A-PDCCH CSS, a Type 1-PDCCH CSS, and/or a Type2-PDCCH CSS. Accordingly, the UE 120 may use the set of monitoring occasions to receive an SIB1 message, other SIB messages, an RAR, and/or a paging message, respectively.

In some aspects, the broadcast message may indicate a periodicity and an offset associated with the set of monitoring occasions. For example, the broadcast message may indicate a periodicity represented by M and an offset O as described below in connection with FIG. 6. In some aspects, the broadcast message may encode the periodicity and the offset. As an alternative, the broadcast message may encode an index (e.g., using one or more bits of a pdcch-ConfigSIB1 and/or another similar data structure) that, when input to a table or other data structure (e.g., as described below in connection with FIG. 6) with which the UE 120 is programmed (and/or otherwise preconfigured), indicates the periodicity and the offset. In some aspects, the set of monitoring occasions begins at an initial slot based at least in part on a quantity of slots per radio frame and an SSB index. For example, the UE 120 may determine the initial slot as described below in connection with FIG. 6.

In some aspects, the set of monitoring occasions are associated with a CORESET (e.g., a Type0-PDCCH CORESET as described above in connection with FIG. 3). Accordingly, the set of monitoring occasions may be included in a pattern of non-consecutive slots, and the pattern may be associated with a spacing and offset indicated in the broadcast message. In some aspects, the spacing and offset may be based at least in part on a periodicity associated with the pattern, a quantity of SSB indices, a quantity of search spaces per slot, or a combination thereof. For example, the UE 120 may determine the spacing and offset as described below in connection with FIG. 6.

Figure 7:
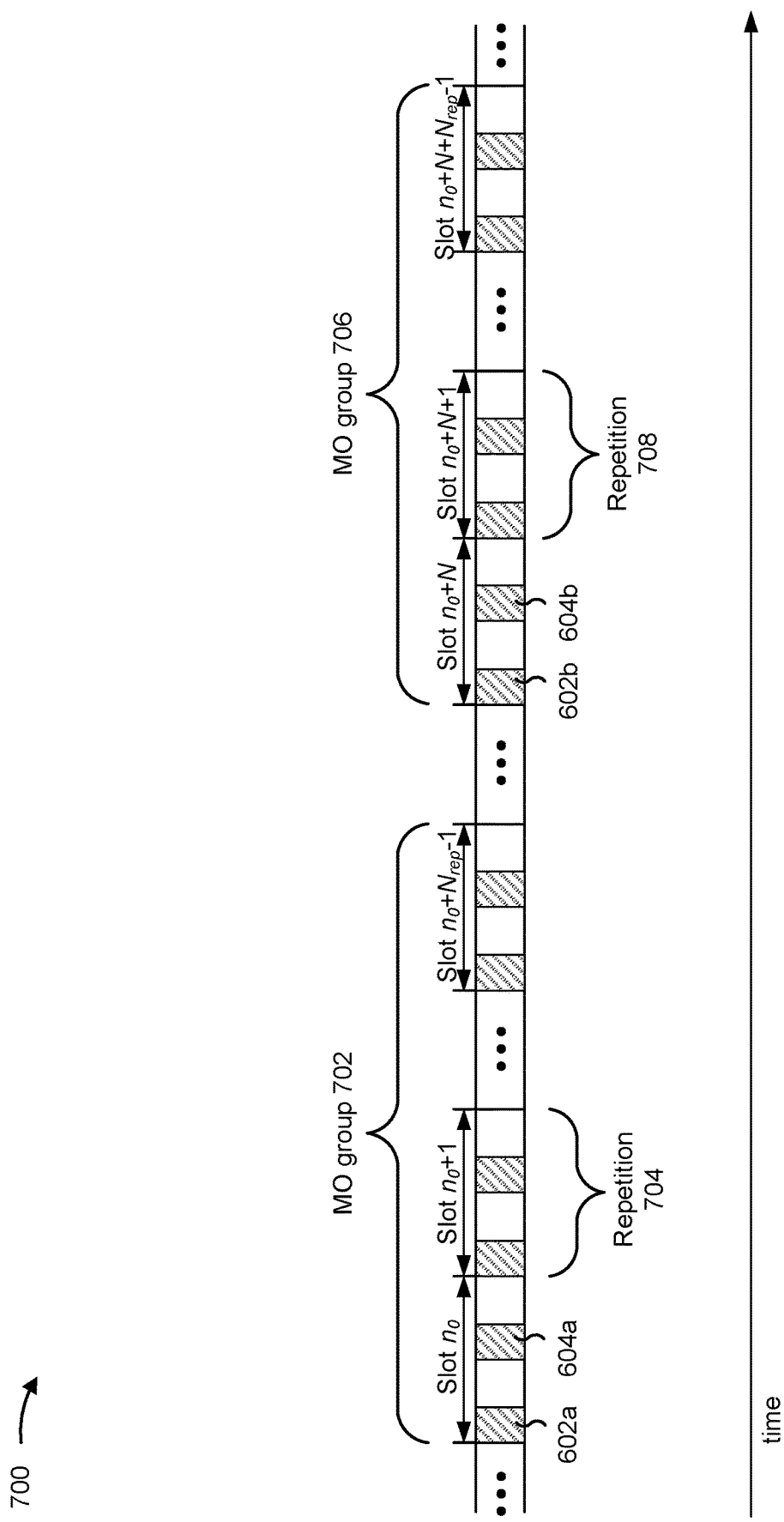

In some aspects, the set of monitoring occasions may include at least a first set of consecutive repetitions and a second set of consecutive repetitions (e.g., as described below in connection with FIG. 7). The first set and the second set may be separated by a spacing indicated in the broadcast message. The first set may include a first quantity of repetitions, and the second set may include a second quantity of repetitions, where the second quantity may be equal to the first quantity (e.g., as shown in FIG. 7), smaller than the first quantity, or larger than the first quantity. In some aspects, the spacing may be based at least in part on a periodicity associated with the first set and the second set, a quantity of SSB indices, a quantity of search spaces per slot, the first quantity and/or the second quantity, or a combination thereof. For example, the UE 120 may determine the spacing as described below in connection with FIG. 7. Accordingly, the UE 120 may select at least one occasion, from the first set of consecutive repetitions, to monitor and at least one occasion, from the second set of consecutive repetitions, to monitor (e.g., as described below in connection with FIG. 7).

As an alternative, the set of monitoring occasions may be included within an RAR window. For example, the broadcast message may include a PDCCH-ConfigCommon data structure, as defined in 3GPP specifications and/or another standard, indicating that a search space for RARs should follow a search space configured for CORESET0. Accordingly, the set of monitoring occasions may be included in a pattern of non-consecutive slots, and the pattern may be associated with a spacing and offset indicated in the broadcast message. For example, rather than monitor for an RAR in one monitoring occasion in every slot, the UE 120 may monitor for the RAR in one monitoring occasion per slot in every $N^{th}$ slot, where N is equal to the periodicity indicated in the broadcast message (e.g., represented by M as described below in connection with FIG. 6). As an alternative, the broadcast message may include a PDCCH-ConfigCommon data structure, as defined in 3GPP specifications and/or another standard, indicating a custom search space for RARs. Accordingly, the UE 120 may determine the set of monitoring occasions based at least in part on the custom search space, and when that custom search set of monitoring occasions includes monitoring occasions in consecutive slots, the UE 120 may adjust the set of monitoring occasions to no longer include consecutive slots. For example, the UE 120 may increase a periodicity associated with the custom search space to match the periodicity indicated in the broadcast message (e.g., represented by M as described below in connection with FIG. 6). Additionally, or alternatively, the UE 120 may discard the custom search space and use the search space configured for CORESET0 instead, as described above.

In some aspects, the RAR window has a length based at least in part on a configuration from the base station 110. For example, the base station 110 may indicate, to the UE 120, a length for the RAR window that is greater than 80 slots (e.g., 3GPP specifications may allow for a configuration that includes more than 80 slots). Additionally, or alternatively, the length may be based at least in part on the spacing. For example, the base station 110 may indicate, to the UE 120, a configuration including a variable (e.g., represented by L). Generally, the variable L may indicate that the RAR window includes L slots. The UE 120 may instead monitor the RAR window with L·N slots, where N may represent the spacing. In any of the aspects described above, scheduling information received in the RAR window may include an indicator of a subframe (e.g., one or more least significant bits (LSBs) associated with an index of that subframe) in which the RAR will be transmitted. Accordingly, the RAR window may be increased beyond the length of one radio frame (e.g., beyond 10 ms).

Additionally, in some aspects, the RAR window may have an offset from an initial slot. For example, the UE 120 may monitor the RAR window including slots associated with an index of the form $N_{off}+N\cdot i$, where N may represent the spacing, $N_{off}$ may represent the offset, and i may represent an integer. In some aspects, the base station 110 may indicate, to the UE 120, an offset for the RAR window. Accordingly, the base station 110 may indicate different offsets to different UEs, which decreases network congestion. Decreased network congestion increases quality and/or reliability of communications with the UE 120, which conserves power and processing resources at the UE 120 by reducing chances that the UE 120 fails to receive and/or successfully decode the RAR.

As an alternative, the UE 120 may determine the offset based at least in part on a random number generated by the UE 120. For example, the UE 120 may generate a random number between 0 and a quantity of repetitions associated with a CORESET (e.g., a Type0-PDCCH CORESET as described above in connection with FIG. 3) (e.g., as described above with respect to the first set of consecutive repetitions and the second set of consecutive repetitions). Accordingly, the base station 110 may transmit repetitions of the RAR (e.g., equivalent repetitions or identical repetitions) across a plurality of slots based at least in part on a set of possible values for the offset (e.g., from 0 to the quantity of repetitions). As an alternative, the UE 120 may determine the offset based at least in part on a random access preamble index (e.g., associated with a random access preamble transmitted by the UE 120), an SSB index (e.g., associated with a random access occasion selected by the UE 120), a slot index associated with the RAR window (e.g., an index associated with the initial slot), a cell index (e.g., a PCID) associated with the base station 110, or a combination thereof. For example, the UE 120 may determine the offset as a modulus of one of the indices described above (e.g., the random access preamble index, which may be represented by $k_p$) with the spacing associated with the RAR window (e.g., the offset may be determined based at least in part on an expression of the form $N_{off}=k_p \mod N$). Accordingly, the base station 110 may determine, for each UE, in which slot to transmit the RAR based at least in part on the offset associated with that UE, which allows the base station 110 to conserve power and processing resources.

As an alternative, the set of monitoring occasions may be associated with a paging occasion. For example, the broadcast message may include a PDCCH-ConfigCommon data structure, as defined in 3GPP specifications and/or another standard, indicating that a search space for paging messages should follow a search space configured for CORESET0. Accordingly, the set of monitoring occasions may be included in a pattern of non-consecutive slots, and the pattern may be associated with a spacing and offset based at least in part on a quantity of transmitted SSBs, a periodicity associated with the pattern, or a combination thereof. For example, the UE 120 may monitor slots represented by $n_i$, $n_i+S$, and so on until $n_i+(X-1)S$, where i may represent an index associated with the SSB that includes the broadcast message, S may represent a quantity of transmitted SSBs (e.g., the base station 110 may transmit a portion of SSBs for which the base station 110 is configured), and X may represent a repetition indicated in PDCCH-ConfigCommon and/or another similar data structure. Accordingly, the UE 120 may instead monitor slots represented by $n_i$, $n_i+N$, and so on until $n_i+(X-1)N$, where N is equal to the periodicity indicated in the broadcast message (e.g., represented by M as described below in connection with FIG. 6). As an alternative, the broadcast message may include a PDCCH-ConfigCommon data structure, as defined in 3GPP specifications and/or another standard, indicating a custom search space for paging messages. Accordingly, the UE 120 may determine the set of monitoring occasions based at least in part on the custom search space, and when that custom search set of monitoring occasions includes monitoring occasions in consecutive slots, the UE 120 may adjust the set of monitoring occasions to no longer include consecutive slots. For example, the UE 120 may increase a periodicity associated with the custom search space to match the periodicity indicated in the broadcast message (e.g., represented by M as described below in connection with FIG. 6). Additionally, or alternatively, the UE 120 may discard the custom search space and use the search space configured for CORESET0 instead, as described above.

As shown in connection with reference number 515, the base station 110 may transmit, and the UE 120 may receive, in at least one monitoring occasion of the set of monitoring occasions, the additional message. For example, the additional message may include scheduling information (e.g., DCI). In some aspects, the scheduling information may be encoded using an SCS between 240 kHz and 1.92 MHz. Additionally, or alternatively, the scheduling information may indicate a scheduling offset greater than one. One example is shown in Table 1 below:

TABLE 1

| DMRS position | PDSCH mapping type | Offset ($K_0$) |
| --- | --- | --- |
| 2 | A | 2 |
| 3 | A | 2 |
| 2 | B | 3 |
| 3 | B | 3 |

In some aspects, the base station 110 may further transmit, and the UE 120 may receive, based at least in part on the scheduling information, an SIB message, an RAR, and/or a paging message. For example, the UE 120 may receive the SIB message, the RAR, and/or the paging message on a PDSCH as scheduled by the DCI or other scheduling information.

By using techniques as described in connection with FIG. 5, the UE 120 may monitor the set of monitoring occasions that are non-consecutive across slots. For example, the base station 110 may configure the set of monitoring occasions using the broadcast message associated with initial access (e.g., as described above in connection with reference number 505). Additionally, or alternatively, the UE 120 may determine to use the set of monitoring occasions based at least in part on a stored rule (e.g., according to 3GPP specifications and/or another standard). As a result, the UE 120 and the base station 110 may experience improved latency and increased quality and/or reliability of communications because the UE 120 is able to monitor all configured monitoring occasions. Additionally, the UE 120 may conserve power by using micro-sleep in at least a portion of at least some slots.

As indicated above, FIG. 5 is provided as an example. Other examples may differ from what is described with respect to FIG. 5.

Figure 6:
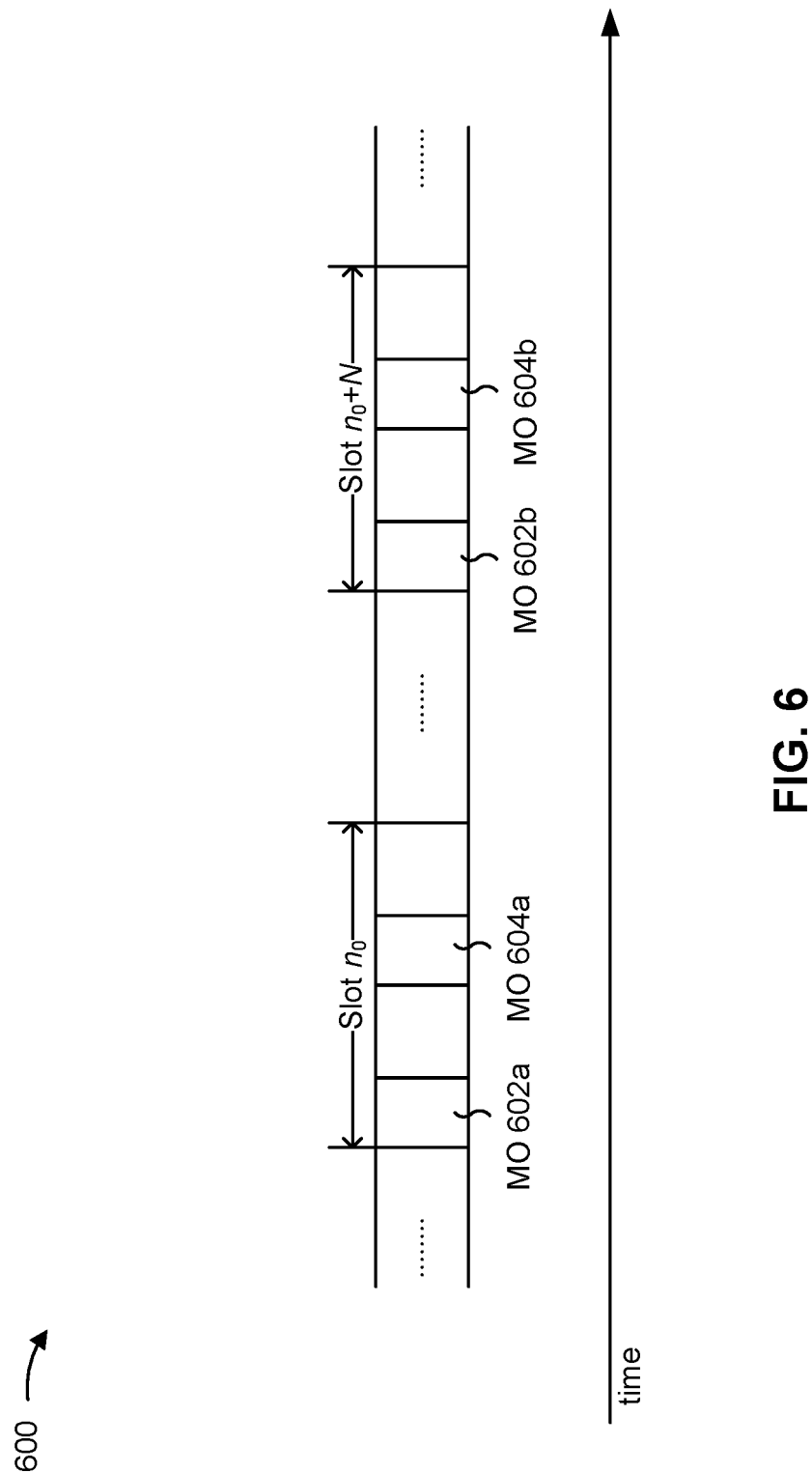

FIG. 6 is a diagram illustrating an example 600 associated with monitoring non-consecutive slots, in accordance with the present disclosure. In example 600, a base station (e.g., base station 110) may transmit, and a UE (e.g., UE 120) may receive, a broadcast message (e.g., a MIB message) that includes a configuration (e.g., a pdcch-ConfigSIB1 data structure as defined in 3GPP specifications and/or another standard) associated with a set of monitoring occasions for an additional message (e.g., for scheduling information associated with an SIB message).

In some aspects, one or more bits of the broadcast message may indicate that the UE 120 should use monitoring occasions in non-consecutive slots to receive the additional message. For example, pdcch-ConfigSIB1 and/or another similar data structure may include an additional bit that, when set to '1' or 'TRUE,' instructs the UE 120 to use monitoring occasions in non-consecutive slots. Additionally, or alternatively, the broadcast message may include a separate bit (e.g., monitoringConfig and/or another variable, defined in 3GPP specifications and/or another standard) that instructs the UE 120 to use monitoring occasions in non-consecutive slots.

Additionally, or alternatively, the UE 120 may use one or more properties associated with and/or indicated in the broadcast message to determine to use monitoring occasions in non-consecutive slots. For example, 3GPP specifications and/or another standard may define a rule that uses one or more of an SCS (e.g., associated with an SSB and indicated in subCarrierSpacingCommon as defined in 3GPP specifications and/or another standard, and/or associated with a PDCCH and indicated in pdcch-ConfigSIB1 as defined in 3GPP specifications and/or another standard), a frequency (e.g., a frequency band in which the SSB was transmitted), and/or a bandwidth (e.g., a minimum transmission bandwidth and/or a maximum transmission bandwidth as defined in 3GPP Technical Specification (TS) 38.101-1 and/or another standard), that the UE 120 may use to determine whether to use monitoring occasions in non-consecutive slots. One example is shown in Table 2 below, where "legacy" refers to monitoring occasions that include consecutive slots:

TABLE 2

| SSB SCS (kHz) | PDCCH SCS (kHz) | Frequency | Bandwidth (MHz) | Legacy? |
| --- | --- | --- | --- | --- |
| 120 | 60 | FR1 | 40 | Yes |
| 120 | 120 | FR2 | 40 | Yes |
| 240 | 120 | FR2 | 40 | Yes |
| 240 | 240 | FR2 | 40 | Yes |
| 240 | 240 | FR4 (e.g., 52.6 GHz to 71 GHz) | 80 | No |
| 240 | 240 | FR5 (e.g., 95 GHz to 325 GHz) | 80 | No |
| 960 | 240 | FR4 | 320 | Yes |
| 960 | 240 | FR5 | 320 | No |
| 960 | 960 | FR4 | 320 | No |
| 960 | 960 | FR5 | 320 | No |
| 1920 | 960 | FR4 | 640 | No |
| 1920 | 960 | FR5 | 640 | No |
| 1920 | 1920 | FR4 | 640 | No |
| 1920 | 1920 | FR5 | 640 | No |

In some aspects, the broadcast message may indicate a periodicity (e.g., represented by M) and an offset (e.g., represented by O) associated with the set of monitoring occasions. For example, the broadcast message may include one or more bits (e.g., four LSBs) that encode an index associated with a table (e.g., included in 3GPP TS 38.213 and/or another standard), where the table indicates the periodicity and the offset.

Accordingly, the UE 120 may monitor the set of monitoring occasions beginning at an initial slot (e.g., represented by $n_0$ in example 600) based at least in part on a quantity of slots per radio frame (e.g., represented by $N_{slot}^{frame}$) and an SSB index (e.g., represented by i). In some aspects, the UE 120 may determine the initial slot $n_0$ based at least in part on Equation 1 below $$n_0 = (O \cdot 2^\mu + [i \cdot M]) \bmod N_{slot}^{frame}, \qquad \text{(Equation 1)}$$

where μ is based at least in part on $N_{slot}^{frame}$. For example, μ may be based at least in part on a table (e.g., Table 4.3.2-1 in 3GPP TS 38.211 and/or another standard), an example of which is shown below:

TABLE 3

| μ | Symbols per slot ($N_{symb}^{slot}$) | Slots per frame ($N_{slot}^{frame}$) | Slots per subframe ($N_{slot}^{subframe}$) |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Additionally, as shown in FIG. 6, the set of monitoring occasions may be included in a pattern of non-consecutive slots (e.g., initial slot $n_0$ in example 600 and a non-consecutive slot $n_0+N$ in example 600) that repeats according to periodicity M. In example 600, monitoring occasions (MOs) 602*a* and 602*b* are included in non-consecutive slots $n_0$ and $n_0+N$ and associated with a pattern that repeats according to periodicity M. Additionally, in example 600, MOs 604*a* and 604*b* are also included in non-consecutive slots $n_0$ and $n_0+N$ and associated with a pattern that repeats according to periodicity M. As described above, the periodicity M may be determined using a table (e.g., included in 3GPP TS 38.213 and/or another standard) based at least in part on an index included in the broadcast message. In some aspects, the table may include an extension of Table 13-11 or Table 13-12 in TS 38.213 and/or another standard, such as the example shown below:

TABLE 4

| Index | O | Search spaces per slot | M | First symbol index |
|---|---|---|---|---|
| 16 | 0 | 1 | 4 | 0 |
| 17 | 0 | 2 | 2 | {0 when i is even, 7 when i is odd} |
| 18 | 2.5 | 1 | 4 | 0 |
| 19 | 2.5 | 2 | 2 | {0 when i is even, 7 when i is odd} |
| 20 | 5 | 1 | 4 | 0 |
| 21 | 5 | 1 | 2 | {0 when i is even, 7 when i is odd} |
| 22 | 0 | 2 | 2 | {0 when i is even, 7 when i is odd} |
| 23 | 2.5 | 2 | 2 | {0 when i is even, 7 when i is odd} |
| 24 | 5 | 2 | 2 | {0 when i is even, 7 when i is odd} |
| 25 | 7.5 | 1 | 4 | 0 |
| 26 | 7.5 | 2 | 2 | {0 when i is even, 7 when i is odd} |
| 27 | 7.5 | 2 | 2 | {0 when i is even, 7 when i is odd} |
| 28 | 0 | 1 | 8 | 0 |
| 29 | 5 | 1 | 8 | 0 |
| 30 | | | Reserved | |
| 31 | | | Reserved | |

Accordingly, the base station 110 may use an additional bit in the broadcast message to extend an index associated with the periodicity (e.g., represented by M) and the offset (e.g., represented by O) from 16 to 32.

As an alternative, the table may include a new table in TS 38.213 and/or another standard, such as the example shown below:

TABLE 5

| Index | O | Search spaces per slot | M | First symbol index |
|---|---|---|---|---|
| 0 | 0 | 1 | 4 | 0 |
| 1 | 0 | 2 | 2 | {0 when i is even, 7 when i is odd} |
| 2 | 2.5 | 1 | 4 | 0 |
| 3 | 2.5 | 2 | 2 | {0 when i is even, 7 when i is odd} |
| 4 | 5 | 1 | 4 | 0 |
| 5 | 5 | 1 | 2 | {0 when i is even, 7 when i is odd} |
| 6 | 0 | 2 | 2 | {0 when i is even, 7 when i is odd} |
| 7 | 2.5 | 2 | 2 | {0 when i is even, 7 when i is odd} |
| 8 | 5 | 2 | 2 | {0 when i is even, 7 when i is odd} |
| 9 | 7.5 | 1 | 4 | 0 |
| 10 | 7.5 | 2 | 2 | {0 when i is even, 7 when i is odd} |
| 11 | 7.5 | 2 | 2 | {0 when i is even, 7 when i is odd} |
| 12 | 0 | 1 | 8 | 0 |
| 13 | 5 | 1 | 8 | 0 |
| 14 | | | Reserved | |
| 15 | | | Reserved | |

Accordingly, the base station 110 may use an additional bit in the broadcast message to instruct the UE 120 to use the new table rather than an existing table (e.g., Table 13-11 or Table 13-12 in TS 38.213 and/or another standard). Although example 600 includes two monitoring occasions in one slot (e.g., MOs 602*a* and 602*b* are associated with an SSB having an even index, while MOs 604*a* and 604*b* are associated with an SSB having an odd index), other examples include one monitoring occasion in one slot.

In example 600, N may represent a spacing associated with the pattern. In some aspects, N may be indicated in the broadcast message. For example, N may be equal to periodicity M, where the base station 110 and/or 3GPP specifications select M such that the UE 120 has sufficient processing time for scheduling information transmitted in at least one monitoring occasion of the set of monitoring occasions.

Additionally, or alternatively, N may be selected based at least in part on a quantity of SSB indices (e.g., represented by $L_{max}$), a quantity of search spaces per slot (e.g., represented by K), or a combination thereof. In some aspects, $L_{max}$ may be preconfigured (e.g., as 64, according to 3GPP specifications and/or another standard). As an alternative, the base station 110 may indicate $L_{max}$ to the UE 120 based at least in part on how many SSBs the base station 110 is configured to transmit. Additionally, as described above, K may be equal to 1 or 2 based at least in part on whether a slot includes two monitoring occasions (e.g., associated with two SSBs) or one monitoring occasion (e.g., associated with one SSB). In one example, then, the UE 120 may select N based at least in part on $L_{max}/K$ such that the base station 110 can transmit scheduling information associated with other SSBs in intervening slots before the UE 120 monitors for scheduling information again. In some aspects, the UE 120 may select N as the maximum of M or $L_{max}/K$. For example, the base station 110 can configure a larger periodicity in some circumstances (e.g., by indicating an M larger than $L_{max}/K$ in the broadcast message and/or by selecting an index from a table, as described above, associated with an M larger than $L_{max}/K$).

Additionally, or alternatively, N may be selected based at least in part on an SCS (e.g., associated with an SSB and indicated in subCarrierSpacingCommon as defined in 3GPP specifications and/or another standard, and/or associated with a PDCCH and indicated in pdcch-ConfigSIB1 as defined in 3GPP specifications and/or another standard). For example, a stored rule (e.g., according to 3GPP specifications and/or another standard) may indicate to use a smaller spacing (e.g., N=4) for a smaller SCS (e.g., 480 kHz) and a larger spacing (e.g., N=8) for a larger SCS (e.g., 960 kHz).

In some aspects, the base station 110 may multiplex, in frequency and/or space, at least some scheduling information associated with different SSBs in frequency such that the UE 120 may select N smaller than $L_{max}/K$. In one example, the base station 110 may multiplex scheduling information associated with pairs of SSBs such that the UE 120 may select N based at least in part on $L_{max}/2K$. Accordingly, the UE 120 may select N as the maximum of M or $L_{max}/2K$.

By using techniques as described in connection with FIG. 6, the UE 120 may monitor a set of monitoring occasions that are non-consecutive across slots. For example, the base station 110 may configure the set of monitoring occasions using the broadcast message associated with initial access. Additionally, or alternatively, the UE 120 may determine to use the set of monitoring occasions based at least in part on a stored rule (e.g., according to 3GPP specifications and/or another standard). As a result, the UE 120 and the base station 110 may experience improved latency and increased quality and/or reliability of communications because the UE 120 is able to monitor all configured monitoring occasions. Additionally, the UE 120 may conserve power by using micro-sleep in at least a portion of at least some slots.

As indicated above, FIG. 6 is provided as an example. Other examples may differ from what is described with respect to FIG. 6.

FIG. 7 is a diagram illustrating an example 700 associated with monitoring non-consecutive slots, in accordance with the present disclosure. In example 700, a base station (e.g., base station 110) may transmit, and a UE (e.g., UE 120) may receive, a broadcast message (e.g., a MIB message) that includes a configuration (e.g., a pdcch-ConfigSIB1 data structure as defined in 3GPP specifications and/or another standard) associated with a set of monitoring occasions for an additional message (e.g., for scheduling information associated with an SIB message).

In some aspects, one or more bits of the broadcast message may indicate that the UE 120 should use monitoring occasions in non-consecutive slots to receive the additional message. For example, pdcch-ConfigSIB1 and/or another similar data structure may include an additional bit that, when set to '1' or 'TRUE,' instructs the UE 120 to use monitoring occasions in non-consecutive slots. Additionally, or alternatively, the broadcast message may include a separate bit (e.g., monitoringConfig and/or another variable, defined in 3GPP specifications and/or another standard) that instructs the UE 120 to use monitoring occasions in non-consecutive slots.

Additionally, or alternatively, the UE 120 may use one or more properties associated with and/or indicated in the broadcast message to determine to use monitoring occasions in non-consecutive slots (e.g., as described above in connection with FIG. 6). One example is shown in Table 2 above described in connection with FIG. 6.

In some aspects, the broadcast message may indicate a periodicity (e.g., represented by M) and an offset (e.g., represented by O) associated with the set of monitoring occasions. For example, the broadcast message may include one or more bits (e.g., four LSBs) that encode an index associated with a table (e.g., included in 3GPP TS 38.213 and/or another standard), where the table indicates the periodicity and the offset.

Additionally, as shown in FIG. 6, the set of monitoring occasions may include at least a first set of consecutive repetitions (e.g., MO group 702 in example 700) and a second set of consecutive repetitions (e.g., MO group 706 in example 700) that repeat according to periodicity M. Although described in connection with two sets of consecutive repetitions that repeat according to periodicity M, the description similarly applies to additional sets (e.g., three sets, four sets, and so on) of consecutive repetitions that repeat according to periodicity M In example 700, MOs 602a and 602b are included in non-consecutive slots $n_0$ and $n_0+N$ across the first set and the second set. Similarly, in example 700, MOs 604a and 604b are also included in non-consecutive slots $n_0$ and $n_0+N$ across the first set and the second set. The first set of consecutive repetitions further includes a first quantity of repetitions (e.g., represented by $N_{rep}$ in example 700), such as repetition 704. Accordingly, the base station 110 may transmit repetitions of scheduling information across MOs within the first set of consecutive repetitions. In some aspects, the base station 110 may transmit identical repetitions, where "identical" refers to same data and a same mapping to physical resources (e.g., frequency resources) within the MOs. As an alternative, the base station 110 may transmit equivalent repetitions, where "equivalent" refer to same data but different mappings to physical resources within the MOs.

The UE 120 may thus select one of the MOs within the first set of consecutive repetitions to monitor such that, when the UE 120 is also monitoring according to additional MO configurations, the UE 120 may select an MO within the first set of consecutive repetitions that conserves power (e.g., by providing a longer micro sleep cycle for the UE 120) and/or provides sufficient reception and decoding time (e.g., such that the scheduling information is not discarded, which wastes power and processing resources). Additionally, or alternatively, the UE 120 may combine signals received in two or more MOs from the first set of consecutive repetitions in order to decode the scheduling information. For example, the UE 120 may combine signals when the base station 110 transmits identical repetitions. By combining signals, the UE 120 may increase chances of successfully decoding the scheduling information, which prevents wasted power and processing resources when the scheduling information is not successfully decoded and is instead discarded.

Similarly, the second set of consecutive repetitions may include a second quantity of repetitions, such as repetition 708. The first quantity may be equal to the second quantity (e.g., as shown in FIG. 7) or may be smaller or larger. Accordingly, the base station 110 may transmit repetitions of scheduling information across MOs within the second set of consecutive repetitions. Additionally, the UE 120 may select one of the MOs within the second set of consecutive repetitions to monitor and/or combine signals received in two or more MOs from the second set of consecutive repetitions (e.g., as similarly described above for the first set of consecutive repetitions).

As described above, the periodicity M may be determined using a table (e.g., included in 3GPP TS 38.213 and/or another standard) based at least in part on an index included in the broadcast message. In some aspects, the table may include an extension of Table 13-11 or Table 13-12 in TS 38.213 and/or another standard, such as the example shown above as Table 4 in connection with FIG. 6. As an alternative, the table may include a new table in TS 38.213 and/or another standard, such as the example shown above as Table 5 in connection with FIG. 6.

Similarly, the quantity of repetitions $N_{rep}$ may be indicated in the broadcast message. Additionally, or alternatively, the quantity of repetitions $N_{rep}$ may be determined using a table (e.g., included in 3GPP TS 38.213 and/or another standard) based at least in part on an SCS (e.g., associated with an SSB and indicated in subCarrierSpacing-Common as defined in 3GPP specifications and/or another standard, and/or associated with a PDCCH and indicated in pdcch-ConfigSIB1 as defined in 3GPP specifications and/or another standard), a frequency (e.g., a frequency band in which the SSB was transmitted), and/or a bandwidth (e.g., a minimum transmission bandwidth and/or a maximum transmission bandwidth as defined in 3GPP TS 38.101-1 and/or another standard). One example is shown in Table 6 below:

TABLE 6

| SSB SCS (kHz) | PDCCH SCS (kHz) | Frequency | Bandwidth (MHz) | $N_{rep}$ |
|---|---|---|---|---|
| 240 | 240 | FR4 (e.g., 52.6 GHz to 71 GHz) | 80 | 4 |
| 240 | 240 | FR5 (e.g., 95 GHz to 325 GHz) | 80 | 4 |
| 960 | 240 | FR5 | 320 | 4 |
| 960 | 960 | FR4 | 320 | 8 |
| 960 | 960 | FR5 | 320 | 8 |
| 1920 | 960 | FR4 | 640 | 8 |
| 1920 | 960 | FR5 | 640 | 8 |
| 1920 | 1920 | FR4 | 640 | 16 |
| 1920 | 1920 | FR5 | 640 | 16 |

In example 700, N may represent a spacing associated with the first set and the second set of consecutive repetitions. In some aspects, N may be indicated in the broadcast message. For example, N may be equal to periodicity M, where the base station 110 and/or 3GPP specifications select M such that the UE 120 has sufficient processing time for scheduling information transmitted in at least one monitoring occasion of the set of monitoring occasions.

Additionally, or alternatively, N may be selected based at least in part on a quantity of SSB indices (e.g., represented by $L_{max}$), a quantity of search spaces per slot (e.g., represented by K), the quantity of repetitions (e.g., represented by $N_{rep}$), or a combination thereof. In some aspects, $L_{max}$ may be preconfigured (e.g., as 64, according to 3GPP specifications and/or another standard). As an alternative, the base station 110 may indicate $L_{max}$ to the UE 120 based at least in part on how many SSBs the base station 110 is configured to transmit. Additionally, as described above, K may be equal to 1 or 2 based at least in part on whether a slot includes two monitoring occasions (e.g., associated with two SSBs) or one monitoring occasion (e.g., associated with one SSB). In one example, then, the UE 120 may select N based at least in part on $N_{rep} \cdot L_{max}/K$ such that the base station 110 can repeat scheduling information across a set of consecutive repetitions, as well as transmit scheduling information associated with other SSBs in intervening slots, before the UE 120 monitors for scheduling information again. In some aspects, the UE 120 may select N as the maximum of M or $N_{rep} \cdot L_{max}/K$. For example, the base station 110 can configure a larger periodicity in some circumstances (e.g., by indicating an M larger than $N_{rep} \cdot L_{max}/K$ in the broadcast message and/or by selecting an index from a table, as described above, associated with an M larger than $N_{rep} \cdot L_{max}/K$).

In some aspects, the base station 110 may multiplex, in frequency and/or space, at least some scheduling information associated with different SSBs in frequency such that the UE 120 may select N smaller than $N_{rep} \cdot L_{max}/K$. In one example, the base station 110 may multiplex scheduling information associated with pairs of SSBs such that the UE 120 may select N based at least in part on $N_{rep} \cdot L_{max}/2K$. Accordingly, the UE 120 may select N as the maximum of M or $N_{rep} \cdot L_{max}/2K$.

Accordingly, the UE 120 may monitor the set of monitoring occasions beginning at an initial slot (e.g., represented by $n_0$ in example 700) based at least in part on a quantity of slots per radio frame (e.g., represented by $N_{slot}^{frame}$) and an SSB index (e.g., represented by i). In some aspects, the UE 120 may determine the initial slot $n_0$ based at least in part on Equation 2 below $$n_0 = \left(O \cdot 2^\mu + \left\lfloor \frac{i}{K} \right\rfloor\right) \bmod N_{slot}^{frame}, \quad \text{(Equation 2)}$$

where μ is based at least in part on $N_{slot}^{frame}$. For example, μ may be based at least in part on a table, an example of which is shown above as Table 3, described in connection with FIG. 6.

By using techniques as described in connection with FIG. 7, the UE 120 may monitor at least one occasion from the first set of consecutive repetitions and the second set of consecutive repetitions. For example, the base station 110 may configure the first and second sets using the broadcast message associated with initial access. Accordingly, the UE 120 may select at least one of the MOs within the first set of consecutive repetitions to monitor and select at least one of the MOs within the second set of consecutive repetitions to monitor such that, when the UE 120 is also monitoring according to additional MO configurations, the UE 120 may select the MOs that conserve power (e.g., by providing longer micro sleep cycles for the UE 120) and/or provide sufficient reception and decoding time (e.g., such that the scheduling information from the base station 110 is not discarded, which wastes power and processing resources). Additionally, or alternatively, the UE 120 may combine signals received in two or more MOs from the first set of consecutive repetitions and/or two or more MOs from the second set of consecutive repetitions in order to decode the scheduling information. By combining signals, the UE 120 may increase chances of successfully decoding the scheduling information, which prevents wasted power and processing resources when the scheduling information is not successfully decoded and is instead discarded.

As indicated above, FIG. 7 is provided as an example. Other examples may differ from what is described with respect to FIG. 7.

Figure 8:
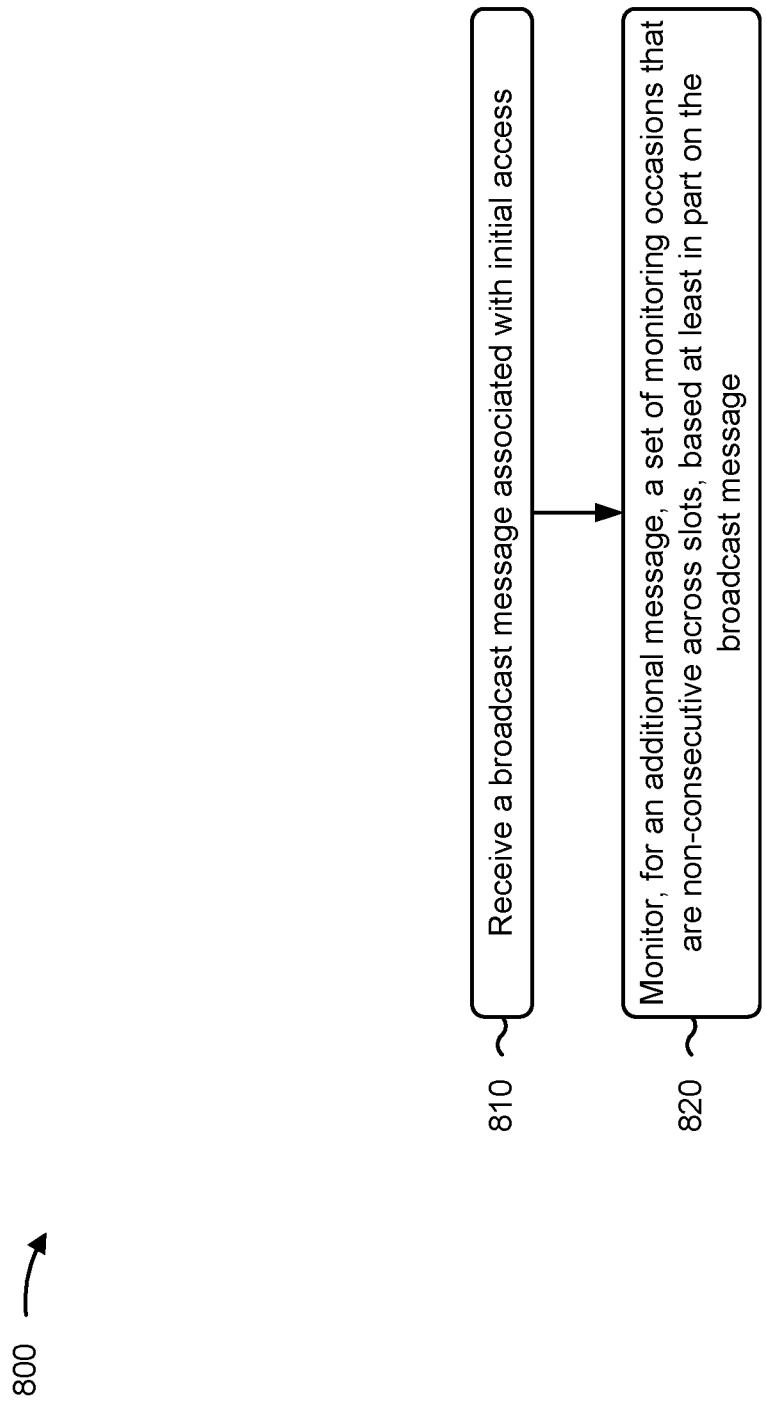
FIGS. 8 and 9 are diagrams illustrating example processes associated with configuring and using monitoring occasions in non-consecutive slots, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with using monitoring occasions in non-consecutive slots.

As shown in FIG. 8, in some aspects, process 800 may include receiving, from a base station (e.g., base station 110 and/or apparatus 1100 of FIG. 11), a broadcast message associated with initial access (block 810). For example, the UE (e.g., using communication manager 140 and/or reception component 1002, depicted in FIG. 10) may receive a broadcast message associated with initial access, as described herein.

As further shown in FIG. 8, in some aspects, process 800 may include monitoring, for an additional message from the base station, a set of monitoring occasions that are non-consecutive across slots, based at least in part on the broadcast message (block 820). For example, the UE (e.g., using communication manager 140 and/or monitoring component 1008, depicted in FIG. 10) may monitor, for an additional message from the base station, a set of monitoring occasions that are non-consecutive across slots, based at least in part on the broadcast message, as described herein.

Process 800 may include additional aspects, such as any single aspect or any combination of aspects described below and/or in connection with one or more other processes described elsewhere herein.

In a first aspect, the broadcast message includes an MIB message.

In a second aspect, alone or in combination with the first aspect, process 800 further includes receiving (e.g., using communication manager 140 and/or reception component 1002), in at least one monitoring occasion of the set of monitoring occasions, scheduling information from the base station that is encoded using an SCS between 240 kHz and 1.92 MHz.

In a third aspect, alone or in combination with one or more of the first and second aspects, the set of monitoring occasions are monitored based at least in part on one or more bits of the broadcast message.

In a fourth aspect, alone or in combination with one or more of the first through third aspects, the set of monitoring occasions are monitored based at least in part on a stored rule that uses an SCS.

In a fifth aspect, alone or in combination with one or more of the first through fourth aspects, the broadcast message further indicates a periodicity and an offset associated with the set of monitoring occasions.

In a sixth aspect, alone or in combination with one or more of the first through fifth aspects, process 800 further includes receiving (e.g., using communication manager 140 and/or reception component 1002), in at least one monitoring occasion of the set of monitoring occasions, scheduling information from the base station, the scheduling information indicating a scheduling offset greater than one.

In a seventh aspect, alone or in combination with one or more of the first through sixth aspects, the set of monitoring occasions begins at an initial slot based at least in part on a quantity of slots per radio frame and an SSB index.

In an eighth aspect, alone or in combination with one or more of the first through seventh aspects, the set of monitoring occasions are associated with a CORESET.

In a ninth aspect, alone or in combination with one or more of the first through eighth aspects, the set of monitoring occasions are included in a pattern of non-consecutive slots, and the pattern is associated with a spacing indicated in the broadcast message.

In a tenth aspect, alone or in combination with one or more of the first through ninth aspects, the spacing is based at least in part on a periodicity associated with the pattern, a quantity of SSB indices, a quantity of search spaces per slot, or a combination thereof.

In an eleventh aspect, alone or in combination with one or more of the first through tenth aspects, the set of monitoring occasions includes at least a first set of consecutive repetitions and a second set of consecutive repetitions, and the first set and the second set are separated by a spacing indicated in the broadcast message.

In a twelfth aspect, alone or in combination with one or more of the first through eleventh aspects, monitoring the set of monitoring occasions includes monitoring at least one occasion from the first set of consecutive repetitions and one occasion selected from the second set of consecutive repetitions.

In a thirteenth aspect, alone or in combination with one or more of the first through twelfth aspects, monitoring the set of monitoring occasions includes combining signals received in two or more occasions from the first set of consecutive repetitions to decode scheduling information from the base station and/or combining signals received in two or more occasions from the second set of consecutive repetitions to decode the scheduling information from the base station.

In a fourteenth aspect, alone or in combination with one or more of the first through thirteenth aspects, the first set includes a quantity of repetitions that is indicated in the broadcast message.

In a fifteenth aspect, alone or in combination with one or more of the first through fourteenth aspects, the spacing is based at least in part on a periodicity associated with the first set of consecutive repetitions and the first set of consecutive repetitions, a quantity of SSB indices, a quantity of search spaces per slot, the quantity of repetitions, or a combination thereof.

In a sixteenth aspect, alone or in combination with one or more of the first through fifteenth aspects, the set of monitoring occasions begins at an initial slot based at least in part on a quantity of slots per radio frame, an SSB index, and the quantity of repetitions.

In a seventeenth aspect, alone or in combination with one or more of the first through sixteenth aspects, the set of monitoring occasions are within an RAR window.

In an eighteenth aspect, alone or in combination with one or more of the first through seventeenth aspects, the RAR window has a length based at least in part on a configuration from the base station.

In a nineteenth aspect, alone or in combination with one or more of the first through eighteenth aspects, the length is further based at least in part on the spacing.

In a twentieth aspect, alone or in combination with one or more of the first through nineteenth aspects, the RAR window has an offset from an initial slot.

In a twenty-first aspect, alone or in combination with one or more of the first through twentieth aspects, the offset is based at least in part on a configuration from the base station.

In a twenty-second aspect, alone or in combination with one or more of the first through twenty-first aspects, the offset is based at least in part on a random number generated by the UE.

In a twenty-third aspect, alone or in combination with one or more of the first through twenty-second aspects, the offset is based at least in part on a random access preamble index, an SSB index, a slot index associated with the RAR window, a cell index associated with the base station, or a combination thereof.

In a twenty-fourth aspect, alone or in combination with one or more of the first through twenty-third aspects, the set of monitoring occasions are associated with a paging occasion.

In a twenty-fifth aspect, alone or in combination with one or more of the first through twenty-fourth aspects, the set of monitoring occasions are included in a pattern of non-consecutive slots, and the pattern is associated with a spacing based at least in part on a quantity of transmitted SSBs, a periodicity associated with the pattern, or a combination thereof.

In a twenty-sixth aspect, alone or in combination with one or more of the first through twenty-fifth aspects, the set of monitoring occasions are associated with a PDCCH.

In a twenty-seventh aspect, alone or in combination with one or more of the first through twenty-sixth aspects, the set of monitoring occasions are associated with a Type0-PDCCH CSS or a Type0A-PDCCH CSS.

In a twenty-eighth aspect, alone or in combination with one or more of the first through twenty-seventh aspects, process 800 further includes receiving (e.g., using communication manager 140 and/or reception component 1002), in at least one monitoring occasion of the set of monitoring occasions, scheduling information from the base station, and receiving (e.g., using communication manager 140 and/or reception component 1002) an SIB message from the base station based at least in part on the scheduling information.

In a twenty-ninth aspect, alone or in combination with one or more of the first through twenty-eighth aspects, the set of monitoring occasions are associated with a Type1-PDCCH CSS.

In a thirtieth aspect, alone or in combination with one or more of the first through twenty-ninth aspects, process 800 further includes receiving (e.g., using communication manager 140 and/or reception component 1002), in at least one monitoring occasion of the set of monitoring occasions, scheduling information from the base station, and receiving (e.g., using communication manager 140 and/or reception component 1002) a random access response from the base station based at least in part on the scheduling information.

In a thirty-first aspect, alone or in combination with one or more of the first through thirtieth aspects, the set of monitoring occasions are associated with a Type2-PDCCH CSS.

In a thirty-second aspect, alone or in combination with one or more of the first through thirty-first aspects, process 800 further includes receiving (e.g., using communication manager 140 and/or reception component 1002), in at least one monitoring occasion of the set of monitoring occasions, scheduling information from the base station, and receiving (e.g., using communication manager 140 and/or reception component 1002) a paging message from the base station based at least in part on the scheduling information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
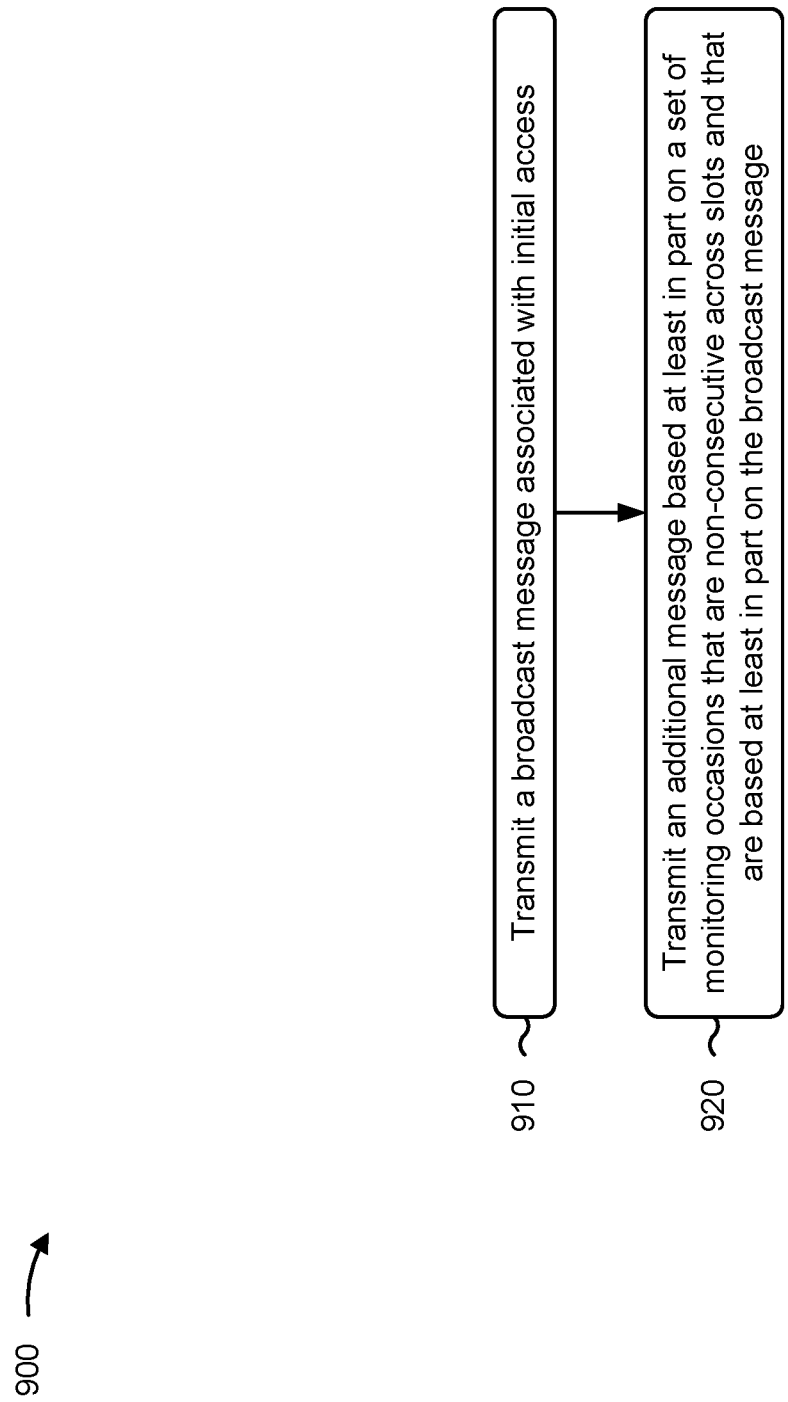

FIG. 9 is a diagram illustrating an example process 900 performed, for example, by a base station, in accordance with the present disclosure. Example process 900 is an example where the base station (e.g., base station 110 and/or apparatus 1100 of FIG. 11) performs operations associated with configuring monitoring occasions in non-consecutive slots.

As shown in FIG. 9, in some aspects, process 900 may include transmitting, to a UE (e.g., UE 120 and/or apparatus 1000 of FIG. 10), a broadcast message associated with initial access (block 910). For example, the base station (e.g., using communication manager 150 and/or transmission component 1104, depicted in FIG. 11) may transmit a broadcast message associated with initial access, as described herein.

As further shown in FIG. 9, in some aspects, process 900 may include transmitting an additional message, to the UE, based at least in part on a set of monitoring occasions that are non-consecutive across slots and that are based at least in part on the broadcast message (block 920). For example, the base station (e.g., using communication manager 150 and/or transmission component 1104) may transmit an additional message based at least in part on a set of monitoring occasions that are non-consecutive across slots and that are based at least in part on the broadcast message, as described herein.

Process 900 may include additional aspects, such as any single aspect or any combination of aspects described below and/or in connection with one or more other processes described elsewhere herein.

In a first aspect, the broadcast message includes an MIB message.

In a second aspect, alone or in combination with the first aspect, process 900 includes transmitting (e.g., using communication manager 150 and/or transmission component 1104), in at least one monitoring occasion of the set of monitoring occasions, scheduling information that is encoded using an SCS between 240 kHz and 1.92 MHz.

In a third aspect, alone or in combination with one or more of the first and second aspects, one or more bits of the broadcast message indicate that the set of monitoring occasions are non-consecutive across slots.

In a fourth aspect, alone or in combination with one or more of the first through third aspects, the set of monitoring occasions are non-consecutive across slots based at least in part on a stored rule that uses an SCS.

In a fifth aspect, alone or in combination with one or more of the first through fourth aspects, the broadcast message further indicates a periodicity and an offset associated with the set of monitoring occasions.

In a sixth aspect, alone or in combination with one or more of the first through fifth aspects, process 900 further includes transmitting (e.g., using communication manager 150 and/or transmission component 1104), in at least one monitoring occasion of the set of monitoring occasions, scheduling information, the scheduling information indicating a scheduling offset greater than one.

In a seventh aspect, alone or in combination with one or more of the first through sixth aspects, the set of monitoring occasions begins at an initial slot based at least in part on a quantity of slots per radio frame and an SSB index.

In an eighth aspect, alone or in combination with one or more of the first through seventh aspects, the set of monitoring occasions are associated with a CORESET.

In a ninth aspect, alone or in combination with one or more of the first through eighth aspects, the set of monitoring occasions are included in a pattern of non-consecutive slots, and the pattern is associated with a spacing indicated in the broadcast message.

In a tenth aspect, alone or in combination with one or more of the first through ninth aspects, the spacing is based at least in part on a periodicity associated with the pattern, a quantity of SSB indices, a quantity of search spaces per slot, or a combination thereof.

In an eleventh aspect, alone or in combination with one or more of the first through tenth aspects, the set of monitoring occasions includes at least a first set of consecutive repetitions and a second set of consecutive repetitions, and the first set and the second set are separated by a spacing indicated in the broadcast message.

In a twelfth aspect, alone or in combination with one or more of the first through eleventh aspects, process 900 further includes transmitting (e.g., using communication manager 150 and/or transmission component 1104) repetitions of first scheduling information within the first set of consecutive repetitions, and transmitting (e.g., using communication manager 150 and/or transmission component 1104) repetitions of second scheduling information within the second set of consecutive repetitions.

In a thirteenth aspect, alone or in combination with one or more of the first through twelfth aspects, the repetitions of the first scheduling information are identical repetitions.

In a fourteenth aspect, alone or in combination with one or more of the first through thirteenth aspects, the repetitions of the first scheduling information are equivalent repetitions.

In a fifteenth aspect, alone or in combination with one or more of the first through fourteenth aspects, the first set includes a quantity of repetitions that is indicated in the broadcast message.

In a sixteenth aspect, alone or in combination with one or more of the first through fifteenth aspects, the spacing is based at least in part on a periodicity associated with the first set of consecutive repetitions and the first set of consecutive repetitions, a quantity of SSB indices, a quantity of search spaces per slot, the quantity of repetitions, or a combination thereof.

In a seventeenth aspect, alone or in combination with one or more of the first through sixteenth aspects, the set of monitoring occasions begins at an initial slot based at least in part on a quantity of slots per radio frame, an SSB index, and the quantity of repetitions.

In an eighteenth aspect, alone or in combination with one or more of the first through seventeenth aspects, the set of monitoring occasions are within an RAR window.

In a nineteenth aspect, alone or in combination with one or more of the first through eighteenth aspects, the RAR window has a length based at least in part on a configuration from the base station.

In a twentieth aspect, alone or in combination with one or more of the first through nineteenth aspects, the length is further based at least in part on the spacing.

In a twenty-first aspect, alone or in combination with one or more of the first through twentieth aspects, the RAR window has an offset from an initial slot.

In a twenty-second aspect, alone or in combination with one or more of the first through twenty-first aspects, the offset is based at least in part on a configuration from the base station.

In a twenty-third aspect, alone or in combination with one or more of the first through twenty-second aspects, process 900 further includes transmitting (e.g., using communication manager 150 and/or transmission component 1104) repetitions of a random access response across a plurality of slots based at least in part on a set of possible values for the offset.

In a twenty-fourth aspect, alone or in combination with one or more of the first through twenty-third aspects, the offset is based at least in part on a random access preamble index, an SSB index, a slot index associated with the RAR window, a cell index associated with the base station, or a combination thereof.

In a twenty-fifth aspect, alone or in combination with one or more of the first through twenty-fourth aspects, the set of monitoring occasions are associated with a paging occasion.

In a twenty-sixth aspect, alone or in combination with one or more of the first through twenty-fifth aspects, the set of monitoring occasions are included in a pattern of non-consecutive slots, and the pattern is associated with a spacing based at least in part on a quantity of transmitted SSBs, a periodicity associated with the pattern, or a combination thereof.

In a twenty-seventh aspect, alone or in combination with one or more of the first through twenty-sixth aspects, the set of monitoring occasions are associated with a PDCCH.

In a twenty-eighth aspect, alone or in combination with one or more of the first through twenty-seventh aspects, the set of monitoring occasions are associated with a Type0-PDCCH CSS or a Type0A-PDCCH CSS.

In a twenty-ninth aspect, alone or in combination with one or more of the first through twenty-eighth aspects, process 900 further includes transmitting (e.g., using communication manager 150 and/or transmission component 1104), in at least one monitoring occasion of the set of monitoring occasions, scheduling information, and transmitting (e.g., using communication manager 150 and/or transmission component 1104) an SIB message based at least in part on the scheduling information.

In a thirtieth aspect, alone or in combination with one or more of the first through twenty-ninth aspects, the set of monitoring occasions are associated with a Type1-PDCCH CSS.

In a thirty-first aspect, alone or in combination with one or more of the first through thirtieth aspects, process 900 further includes transmitting (e.g., using communication manager 150 and/or transmission component 1104), in at least one monitoring occasion of the set of monitoring occasions, scheduling information, and transmitting (e.g., using communication manager 150 and/or transmission component 1104) a random access response based at least in part on the scheduling information.

In a thirty-second aspect, alone or in combination with one or more of the first through thirty-first aspects, the set of monitoring occasions are associated with a Type2-PDCCH CSS.

In a thirty-third aspect, alone or in combination with one or more of the first through thirty-second aspects, process 900 further includes transmitting (e.g., using communication manager 150 and/or transmission component 1104), in at least one monitoring occasion of the set of monitoring occasions, scheduling information, and transmitting (e.g., using communication manager 150 and/or transmission component 1104) a paging message based at least in part on the scheduling information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
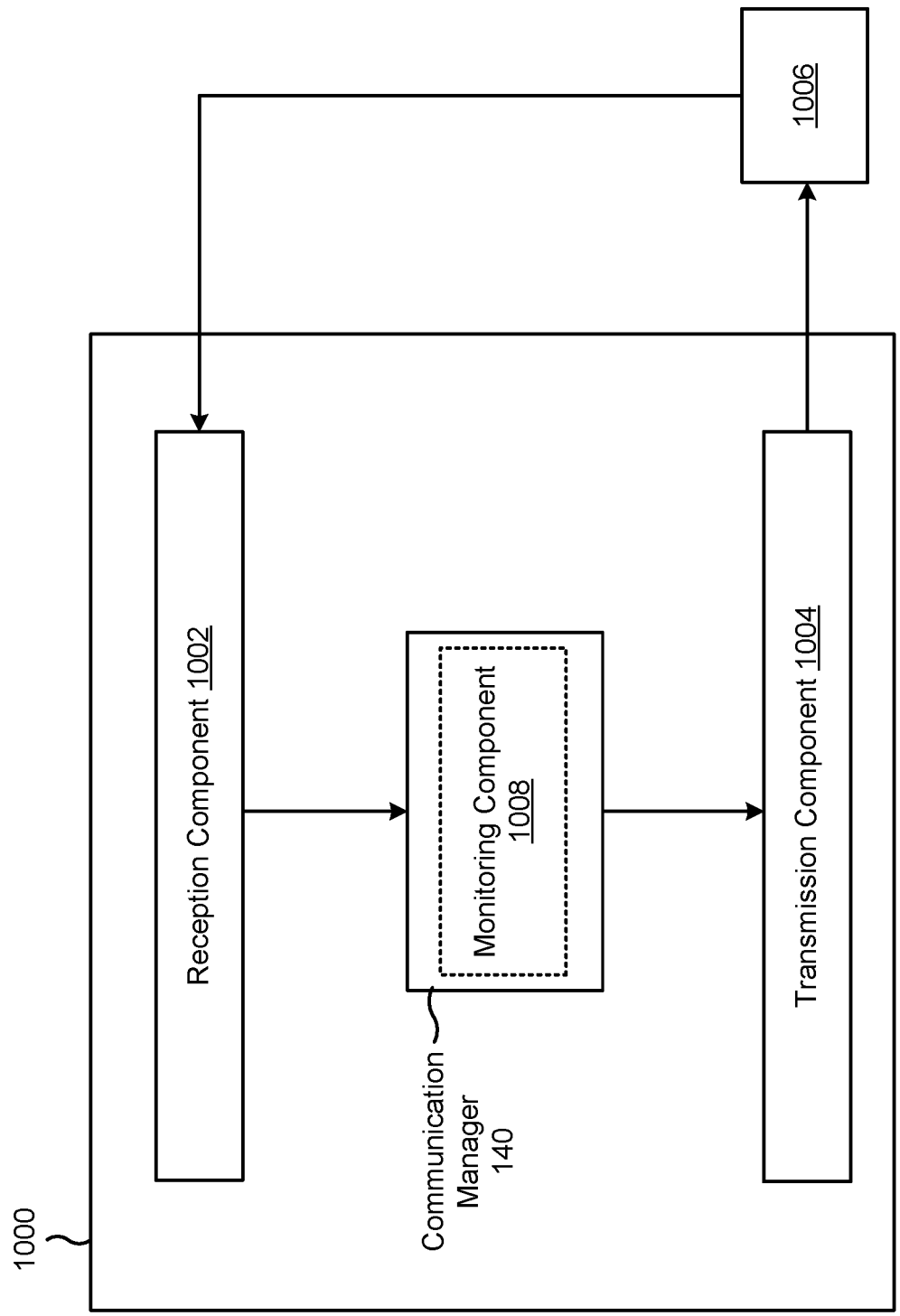
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a monitoring component 1008, among other examples.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some aspects, the reception component 1002 may receive, from the apparatus 1006, a broadcast message associated with initial access. Accordingly, the monitoring component 1008 may monitor, for an additional message from the apparatus 1006, a set of monitoring occasions that are non-consecutive across slots, based at least in part on the broadcast message. In some aspects, the monitoring component 1008 may include one or more antennas, a demodulator, a MIMO detector, a receive processor, a controller/processor, a memory, or a combination thereof, of the UE described above in connection with FIG. 2.

In some aspects, the reception component 1002 may receive, in at least one monitoring occasion of the set of monitoring occasions, scheduling information from the apparatus 1006. For example, the scheduling information may indicate a scheduling offset greater than one and/or may be encoded using an SCS between 240 kHz and 1.92 MHz. In some aspects, the reception component 1002 may further receive an SIB message, an RAR, and/or a paging message based at least in part on the scheduling information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
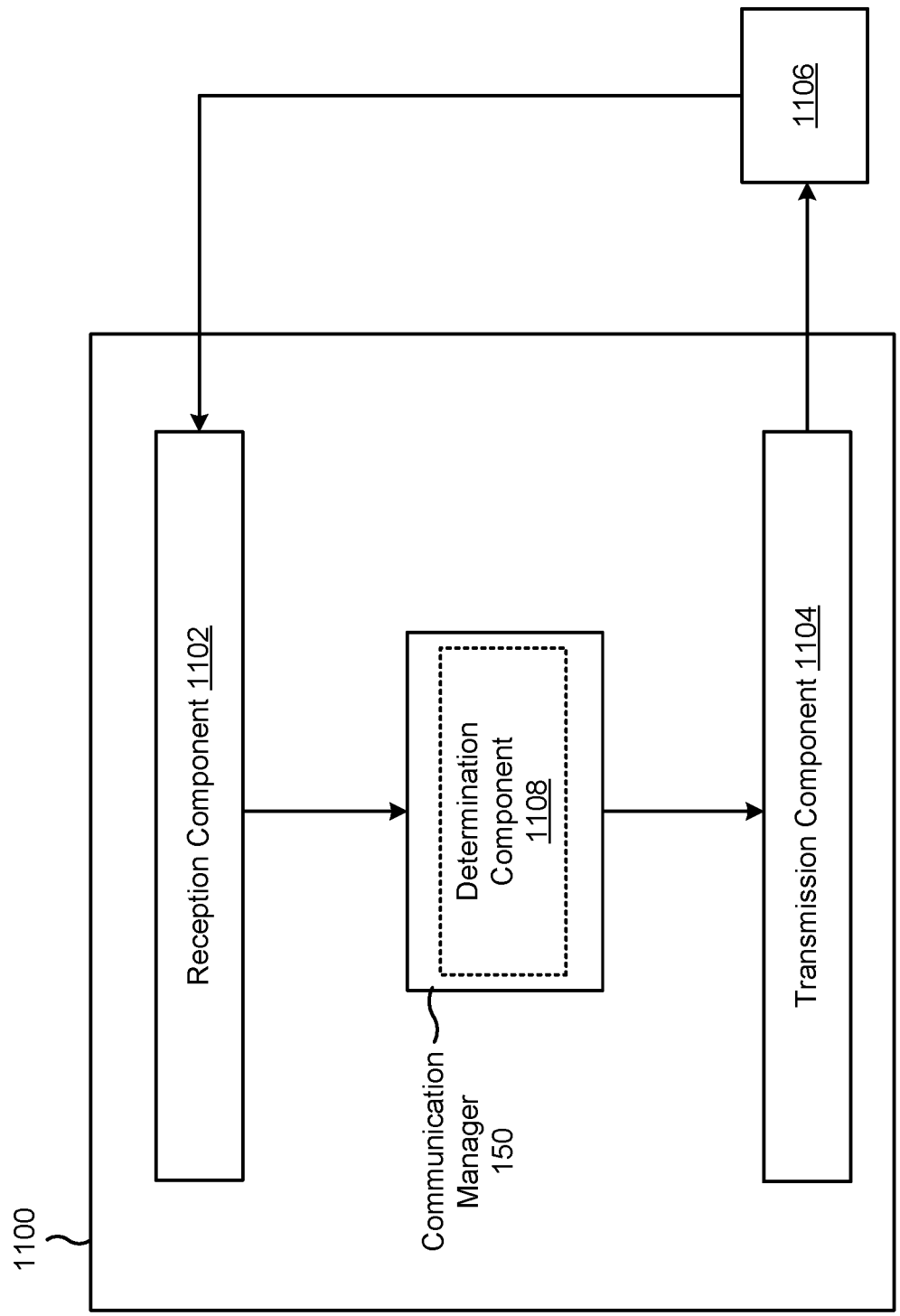

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

In some aspects, the transmission component 1104 may transmit, to the apparatus 1106, a broadcast message associated with initial access. Additionally, the transmission component 1104 may transmit an additional message, to the apparatus 1106, based at least in part on a set of monitoring occasions that are non-consecutive across slots. For example, the determination component 1108 may determine the set of monitoring occasions based at least in part on the broadcast message. In some aspects, the determination component 1108 may include a MIMO detector, a receive processor, a transmit MIMO processor, a transmit processor, a controller/processor, a memory, or a combination thereof, of the base station described above in connection with FIG. 2.

In some aspects, the transmission component 1104 may transmit, in at least one monitoring occasion of the set of monitoring occasions, scheduling information. For example, the scheduling information may indicate a scheduling offset greater than one and/or may be encoded using an SCS between 240 kHz and 1.92 MHz. Accordingly, the additional message may include the scheduling information. In some aspects, the transmission component 1104 may further transmit an SIB message, an RAR, and/or a paging message based at least in part on the scheduling information.

In some aspects, the transmission component 1104 may transmit repetitions of first scheduling information within a first set of consecutive repetition included in the set of monitoring occasions and/or repetitions of second scheduling information within the second set of consecutive repetitions. Additionally, or alternatively, in some aspects, the transmission component 1104 may transmit repetitions of a random access response across a plurality of slots based at least in part on a set of possible values for an offset associated with an RAR window.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, a broadcast message associated with initial access; and monitoring, for an additional message from the base station, a set of monitoring occasions that are non-consecutive across slots, based at least in part on the broadcast message.

Aspect 2: The method of Aspect 1, wherein the broadcast message includes a master information block message.

Aspect 3: The method of any of Aspects 1 through 2, further comprising: receiving, in at least one monitoring occasion of the set of monitoring occasions, scheduling information from the base station that is encoded using a subcarrier spacing between 240 kHz and 1.92 MHz.

Aspect 4: The method of any of Aspects 1 through 3, wherein the set of monitoring occasions are monitored based at least in part on one or more bits of the broadcast message.

Aspect 5: The method of any of Aspects 1 through 4, wherein the set of monitoring occasions are monitored based at least in part on a stored rule that uses one or more of a subcarrier spacing, a frequency, or a bandwidth, indicated in the broadcast message.

Aspect 6: The method of any of Aspects 1 through 5, wherein the broadcast message further indicates a periodicity and an offset associated with the set of monitoring occasions.

Aspect 7: The method of any of Aspects 1 through 6, further comprising: receiving, in at least one monitoring occasion of the set of monitoring occasions, scheduling information from the base station, wherein the scheduling information indicates a scheduling offset greater than one.

Aspect 8: The method of any of Aspects 1 through 7, wherein the set of monitoring occasions begins at an initial slot based at least in part on a quantity of slots per radio frame and a synchronization signal block index.

Aspect 9: The method of any of Aspects 1 through 8, wherein the set of monitoring occasions are associated with a control resource set.

Aspect 10: The method of Aspect 9, wherein the set of monitoring occasions are included in a pattern of non-consecutive slots, and wherein the pattern is associated with a spacing indicated in the broadcast message.

Aspect 11: The method of Aspect 10, wherein the spacing is based at least in part on a periodicity associated with the pattern, a quantity of synchronization signal block (SSB) indices, a quantity of search spaces per slot, or a combination thereof.

Aspect 12: The method of Aspect 9, wherein the set of monitoring occasions includes at least a first set of consecutive repetitions and a second set of consecutive repetitions, and wherein the first set and the second set are separated by a spacing indicated in the broadcast message.

Aspect 13: The method of Aspect 12, wherein monitoring the set of monitoring occasions comprises: monitoring at least one occasion from the first set of consecutive repetitions and one occasion selected from the second set of consecutive repetitions.

Aspect 14: The method of any of Aspects 12 through 13, wherein monitoring the set of monitoring occasions comprises: combining signals received in two or more occasions from the first set of consecutive repetitions to decode scheduling information from the base station; or combining signals received in two or more occasions from the second set of consecutive repetitions to decode the scheduling information from the base station.

Aspect 15: The method of any of Aspects 12 through 14, wherein the first set includes a quantity of repetitions that is indicated in the broadcast message.

Aspect 16: The method of Aspect 15, wherein the spacing is based at least in part on a periodicity associated with the first set of consecutive repetitions and the first set of consecutive repetitions, a quantity of synchronization signal block (SSB) indices, a quantity of search spaces per slot, the quantity of repetitions, or a combination thereof.

Aspect 17: The method of any of Aspects 15 through 16, wherein the set of monitoring occasions begins at an initial slot based at least in part on a quantity of slots per radio frame, a synchronization signal block index, and the quantity of repetitions.

Aspect 18: The method of any of Aspects 1 through 8, wherein the set of monitoring occasions are within a random access response (RAR) window.

Aspect 19: The method of Aspect 18, wherein the set of monitoring occasions are included in a pattern of non-consecutive slots, and wherein the pattern is associated with a spacing indicated in the broadcast message.

Aspect 20: The method of Aspect 19, wherein the RAR window has a length based at least in part on a configuration from the base station.

Aspect 21: The method of Aspect 20, wherein the length is further based at least in part on the spacing.

Aspect 22: The method of any of Aspects 18 through 21, wherein the RAR window has an offset from an initial slot.

Aspect 23: The method of Aspect 22, wherein the offset is based at least in part on a configuration from the base station.

Aspect 24: The method of Aspect 22, wherein the offset is based at least in part on a random number generated by the UE.

Aspect 25: The method of Aspect 22, wherein the offset is based at least in part on a random access preamble index, a synchronization signal block index, a slot index associated with the RAR window, a cell index associated with the base station, or a combination thereof.

Aspect 26: The method of any of Aspects 1 through 8, wherein the set of monitoring occasions are associated with a paging occasion.

Aspect 27: The method of Aspect 26, wherein the set of monitoring occasions are included in a pattern of non-consecutive slots, and wherein the pattern is associated with a spacing based at least in part on a quantity of transmitted synchronization signal blocks, a periodicity associated with the pattern, or a combination thereof.

Aspect 28: The method of any of Aspects 1 through 27, wherein the set of monitoring occasions are associated with a physical downlink control channel (PDCCH).

Aspect 29: The method of Aspect 28, wherein the set of monitoring occasions are associated with a Type0-PDCCH common search space (CSS) or a Type0A-PDCCH CSS.

Aspect 30: The method of Aspect 29, further comprising: receiving, in at least one monitoring occasion of the set of monitoring occasions, scheduling information from the base station; and receiving a system information block message from the base station based at least in part on the scheduling information.

Aspect 31: The method of Aspect 28, wherein the set of monitoring occasions are associated with a Type1-PDCCH common search space.

Aspect 32: The method of Aspect 31, further comprising: receiving, in at least one monitoring occasion of the set of monitoring occasions, scheduling information from the base station; and receiving a random access response from the base station based at least in part on the scheduling information.

Aspect 33: The method of Aspect 28, wherein the set of monitoring occasions are associated with a Type2-PDCCH common search space.

Aspect 34: The method of Aspect 33, further comprising: receiving, in at least one monitoring occasion of the set of monitoring occasions, scheduling information from the base station; and receiving a paging message from the base station based at least in part on the scheduling information.

Aspect 35: A method of wireless communication performed by a base station, comprising: transmitting, to a user equipment (UE), a broadcast message associated with initial access; and transmitting an additional message, to the UE, based at least in part on a set of monitoring occasions that are non-consecutive across slots and that are based at least in part on the broadcast message.

Aspect 36: The method of Aspect 35, wherein the broadcast message includes a master information block message.

Aspect 37: The method of any of Aspects 35 through 36, further comprising: transmitting, in at least one monitoring occasion of the set of monitoring occasions, scheduling information that is encoded using a subcarrier spacing between 240 kHz and 1.92 MHz.

Aspect 38: The method of any of Aspects 35 through 37, wherein one or more bits of the broadcast message indicate that the set of monitoring occasions are non-consecutive across slots.

Aspect 39: The method of Aspect 38, wherein the set of monitoring occasions are non-consecutive across slots based at least in part on a stored rule that uses one or more of a subcarrier spacing, a frequency, or a bandwidth, indicated in the broadcast message.

Aspect 40: The method of any of Aspects 35 through 39, wherein the broadcast message further indicates a periodicity and an offset associated with the set of monitoring occasions.

Aspect 41: The method of any of Aspects 35 through 40, further comprising: transmitting, in at least one monitoring occasion of the set of monitoring occasions, scheduling information, wherein the scheduling information indicates a scheduling offset greater than one.

Aspect 42: The method of any of Aspects 35 through 41, wherein the set of monitoring occasions begins at an initial slot based at least in part on a quantity of slots per radio frame and a synchronization signal block index.

Aspect 43: The method of any of Aspects 35 through 42, wherein the set of monitoring occasions are associated with a control resource set.

Aspect 44: The method of Aspect 43, wherein the set of monitoring occasions are included in a pattern of non-consecutive slots, and wherein the pattern is associated with a spacing indicated in the broadcast message.

Aspect 45: The method of Aspect 44, wherein the spacing is based at least in part on a periodicity associated with the pattern, a quantity of synchronization signal block (SSB) indices, a quantity of search spaces per slot, or a combination thereof.

Aspect 46: The method of Aspect 43, wherein the set of monitoring occasions includes at least a first set of consecutive repetitions and a second set of consecutive repetitions, and wherein the first set and the second set are separated by a spacing indicated in the broadcast message.

Aspect 47: The method of Aspect 46, further comprising: transmitting repetitions of first scheduling information within the first set of consecutive repetitions; and transmitting repetitions of second scheduling information within the second set of consecutive repetitions.

Aspect 48: The method of Aspect 47, wherein the repetitions of the first scheduling information are identical repetitions.

Aspect 49: The method of Aspect 47, wherein the repetitions of the first scheduling information are equivalent repetitions.

Aspect 50: The method of any of Aspects 46 through 49, wherein the first set includes a quantity of repetitions that is indicated in the broadcast message.

Aspect 51: The method of Aspect 50, wherein the spacing is based at least in part on a periodicity associated with the first set of consecutive repetitions and the first set of consecutive repetitions, a quantity of synchronization signal block (SSB) indices, a quantity of search spaces per slot, the quantity of repetitions, or a combination thereof.

Aspect 52: The method of any of Aspects 50 through 51, wherein the set of monitoring occasions begins at an initial slot based at least in part on a quantity of slots per radio frame, a synchronization signal block index, and the quantity of repetitions.

Aspect 53: The method of any of Aspects 35 through 42, wherein the set of monitoring occasions are within a random access response (RAR) window.

Aspect 54: The method of Aspect 53, wherein the set of monitoring occasions are included in a pattern of non-consecutive slots, and wherein the pattern is associated with a spacing indicated in the broadcast message.

Aspect 55: The method of Aspect 54, wherein the RAR window has a length based at least in part on a configuration from the base station.

Aspect 56: The method of Aspect 55, wherein the length is further based at least in part on the spacing.

Aspect 57: The method of any of Aspects 53 through 56, wherein the RAR window has an offset from an initial slot.

Aspect 58: The method of Aspect 57, wherein the offset is based at least in part on a configuration from the base station.

Aspect 59: The method of Aspect 58, further comprising: transmitting repetitions of a random access response across a plurality of slots based at least in part on a set of possible values for the offset.

Aspect 60: The method of Aspect 57, wherein the offset is based at least in part on a random access preamble index, a synchronization signal block index, a slot index associated with the RAR window, a cell index associated with the base station, or a combination thereof.

Aspect 61: The method of any of Aspects 35 through 42, wherein the set of monitoring occasions are associated with a paging occasion.

Aspect 62: The method of Aspect 61, wherein the set of monitoring occasions are included in a pattern of non-consecutive slots, and wherein the pattern is associated with a spacing based at least in part on a quantity of transmitted synchronization signal blocks, a periodicity associated with the pattern, or a combination thereof.

Aspect 63: The method of any of Aspects 1 through 62, wherein the set of monitoring occasions are associated with a physical downlink control channel (PDCCH).

Aspect 64: The method of Aspect 63, wherein the set of monitoring occasions are associated with a Type0-PDCCH common search space (CSS) or a Type0A-PDCCH CSS.

Aspect 65: The method of Aspect 64, further comprising: transmitting, in at least one monitoring occasion of the set of monitoring occasions, scheduling information; and transmitting a system information block message based at least in part on the scheduling information.

Aspect 66: The method of Aspect 63, wherein the set of monitoring occasions are associated with a Type1-PDCCH common search space.

Aspect 67: The method of Aspect 66, further comprising: transmitting, in at least one monitoring occasion of the set of monitoring occasions, scheduling information; and transmitting a random access response based at least in part on the scheduling information.

Aspect 68: The method of Aspect 63, wherein the set of monitoring occasions are associated with a Type2-PDCCH common search space.

Aspect 69: The method of Aspect 68, further comprising: transmitting, in at least one monitoring occasion of the set of monitoring occasions, scheduling information; and transmitting a paging message based at least in part on the scheduling information.

Aspect 70: An apparatus for wireless communication at a device, comprising a processor; memory coupled with the processor; and instructions stored in the memory and executable by the processor to cause the apparatus to perform the method of one or more of Aspects 1-34.

Aspect 71: A device for wireless communication, comprising a memory and one or more processors coupled to the memory, the one or more processors configured to perform the method of one or more of Aspects 1-34.

Aspect 72: An apparatus for wireless communication, comprising at least one means for performing the method of one or more of Aspects 1-34.

Aspect 73: A non-transitory computer-readable medium storing code for wireless communication, the code comprising instructions executable by a processor to perform the method of one or more of Aspects 1-34.

Aspect 74: A non-transitory computer-readable medium storing a set of instructions for wireless communication, the set of instructions comprising one or more instructions that, when executed by one or more processors of a device, cause the device to perform the method of one or more of Aspects 1-34.

Aspect 75: An apparatus for wireless communication at a device, comprising a processor; memory coupled with the processor; and instructions stored in the memory and executable by the processor to cause the apparatus to perform the method of one or more of Aspects 35-69.

Aspect 76: A device for wireless communication, comprising a memory and one or more processors coupled to the memory, the one or more processors configured to perform the method of one or more of Aspects 35-69.

Aspect 77: An apparatus for wireless communication, comprising at least one means for performing the method of one or more of Aspects 35-69.

Aspect 78: A non-transitory computer-readable medium storing code for wireless communication, the code comprising instructions executable by a processor to perform the method of one or more of Aspects 35-69.

Aspect 79: A non-transitory computer-readable medium storing a set of instructions for wireless communication, the set of instructions comprising one or more instructions that, when executed by one or more processors of a device, cause the device to perform the method of one or more of Aspects 35-69.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a network entity, a broadcast message associated with initial access; and
monitor, for an additional message from the network entity, a set of monitoring occasions that are non-consecutive across slots, based at least in part on the broadcast message.

2. The apparatus of claim 1, wherein the broadcast message includes a master information block message.

3. The apparatus of claim 1, wherein the one or more processors are further configured to:
receive, in at least one monitoring occasion of the set of monitoring occasions, scheduling information from the network entity that is encoded using a subcarrier spacing between 240 kHz and 1.92 MHz.

4. The apparatus of claim 1, wherein the set of monitoring occasions are monitored based at least in part on a stored rule that uses a subcarrier spacing.

5. The apparatus of claim 1, wherein the one or more processors are further configured to:
receive, in at least one monitoring occasion of the set of monitoring occasions, scheduling information from the network entity,
wherein the scheduling information indicates a scheduling offset greater than one.

6. The apparatus of claim 1, wherein the set of monitoring occasions begins at an initial slot based at least in part on a quantity of slots per radio frame and a synchronization signal block index.

7. The apparatus of claim 1, wherein the set of monitoring occasions are associated with a control resource set.

8. The apparatus of claim 1, wherein the set of monitoring occasions are within a random access response (RAR) window.

9. The apparatus of claim 8, wherein the RAR window has a length based at least in part on a configuration from the network entity.

10. The apparatus of claim 8, wherein the RAR window has an offset from an initial slot.

11. The apparatus of claim 10, wherein the offset is based at least in part on a configuration from the network entity.

12. The apparatus of claim 10, wherein the offset is based at least in part on a random access preamble index, a synchronization signal block index, a slot index associated with the RAR window, a cell index associated with the network entity, or a combination thereof.

13. The apparatus of claim 1, wherein the set of monitoring occasions are associated with a paging occasion.

14. The apparatus of claim 1, wherein the set of monitoring occasions are associated with a physical downlink control channel (PDCCH).

15. The apparatus of claim 14, wherein the set of monitoring occasions are associated with a Type0-PDCCH common search space (CSS) or a Type0A-PDCCH CSS.

16. The apparatus of claim 15, wherein the one or more processors are further configured to:
receive, in at least one monitoring occasion of the set of monitoring occasions, scheduling information from the network entity; and
receive a system information block message from the network entity based at least in part on the scheduling information.

17. The apparatus of claim 14, wherein the set of monitoring occasions are associated with a Type1-PDCCH common search space.

18. The apparatus of claim 17, wherein the one or more processors are further configured to:
receive, in at least one monitoring occasion of the set of monitoring occasions, scheduling information from the network entity; and
receive a random access response from the network entity based at least in part on the scheduling information.

19. The apparatus of claim 14, wherein the set of monitoring occasions are associated with a Type2-PDCCH common search space.

20. The apparatus of claim 19, wherein the one or more processors are further configured to:
receive, in at least one monitoring occasion of the set of monitoring occasions, scheduling information from the network entity; and
receive a paging message from the network entity based at least in part on the scheduling information.

21. An apparatus for wireless communication at a base station network entity, comprising:
a memory; and
one or more processors, coupled to the memory, configured to:
transmit, to a user equipment (UE), a broadcast message associated with initial access; and
transmit an additional message, to the UE, based at least in part on a set of monitoring occasions that are non-consecutive across slots and that are based at least in part on the broadcast message.

22. The apparatus of claim 21, wherein the one or more processors are further configured to:
transmit, in at least one monitoring occasion of the set of monitoring occasions, scheduling information that is encoded using a subcarrier spacing between 240 kHz and 1.92 MHz.

23. The apparatus of claim 21, wherein the set of monitoring occasions are non-consecutive across slots based at least in part on a stored rule that uses a subcarrier spacing.

24. The apparatus of claim 21, wherein the set of monitoring occasions are associated with a control resource set.

25. The apparatus of claim 21, wherein the set of monitoring occasions are within a random access response (RAR) window.

26. The apparatus of claim 21, wherein the set of monitoring occasions are associated with a paging occasion.

27. The apparatus of claim 21, wherein the set of monitoring occasions are associated with a physical downlink control channel (PDCCH).

28. The apparatus of claim 27, wherein the set of monitoring occasions are associated with a Type0-PDCCH common search space (CSS), a Type0A-PDCCH CSS, a Type1-PDCCH CSS, or a Type2-PDCCH CSS.

29. A method of wireless communication performed by a user equipment (UE), comprising:
receiving, from a network entity, a broadcast message associated with initial access; and
monitoring, for an additional message from the network entity, a set of monitoring occasions that are non-consecutive across slots, based at least in part on the broadcast message.

30. A method of wireless communication performed by a network entity, comprising:
transmitting, to a user equipment (UE), a broadcast message associated with initial access; and
transmitting an additional message, to the UE, based at least in part on a set of monitoring occasions that are non-consecutive across slots and that are based at least in part on the broadcast message.

* * * * *